Feb. 24, 1925.
J. HÖLTERMAND
1,527,873
MARK ATTACHING MACHINE
Filed Oct. 6, 1922     12 Sheets-Sheet 1
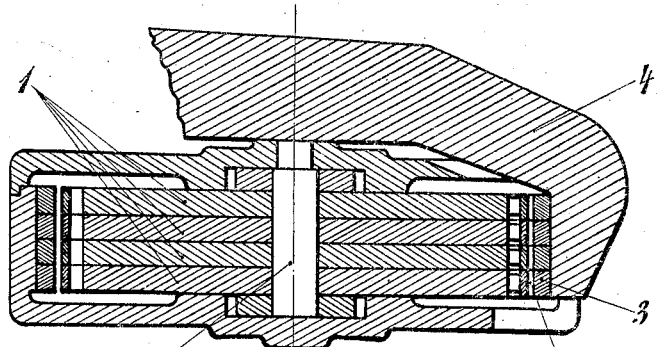
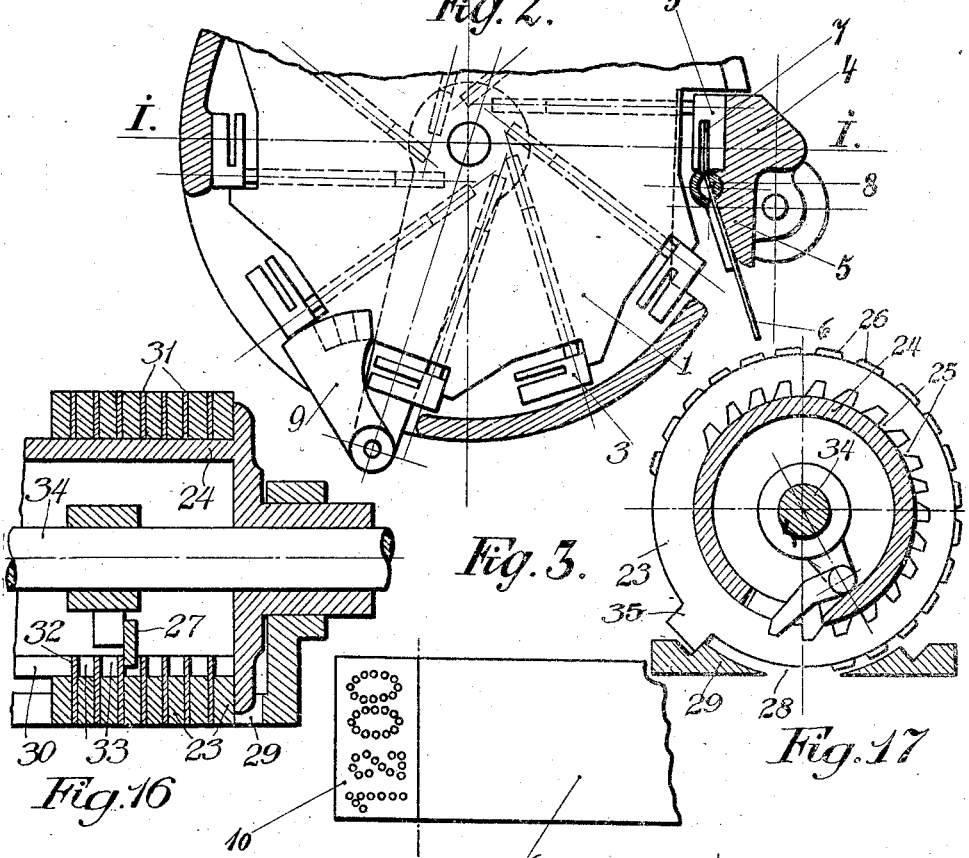
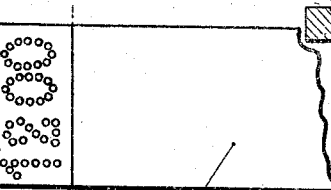
INVENTOR
JENS HÖLTERMAND
by Spear, Middleton, Donaldson & Hall
Attys Feb. 24, 1925.
J. HÖLTERMAND
MARK ATTACHING MACHINE
Filed Oct. 6, 1922
1,527,873
12 Sheets-Sheet 2

INVENTOR:
JENS HÖLTERMAND
by Spear, Middleton, Donaldson & Hall.
Attys

Feb. 24, 1925. 1,527,873
J. HÖLTERMAND
MARK ATTACHING MACHINE
Filed Oct. 6, 1922 12 Sheets-Sheet 3
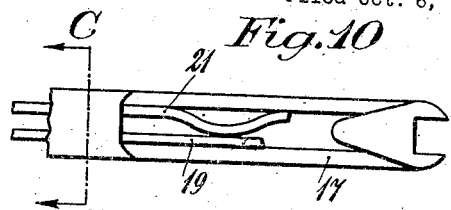
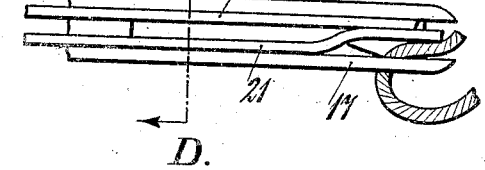
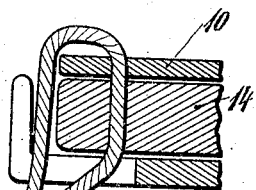
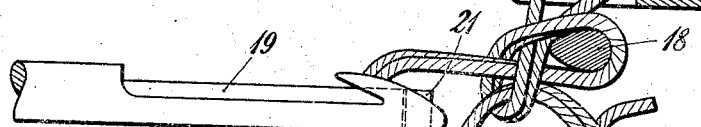
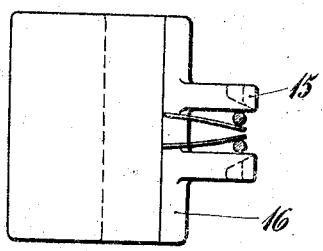
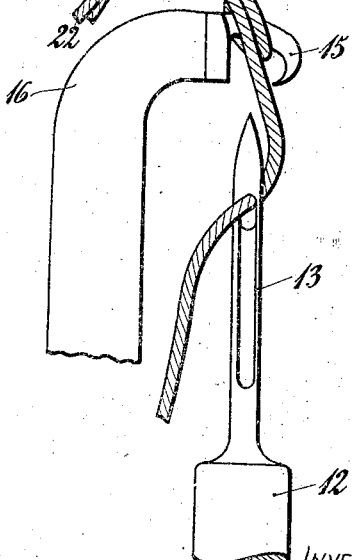
INVENTOR:
JENS HÖLTERMAND

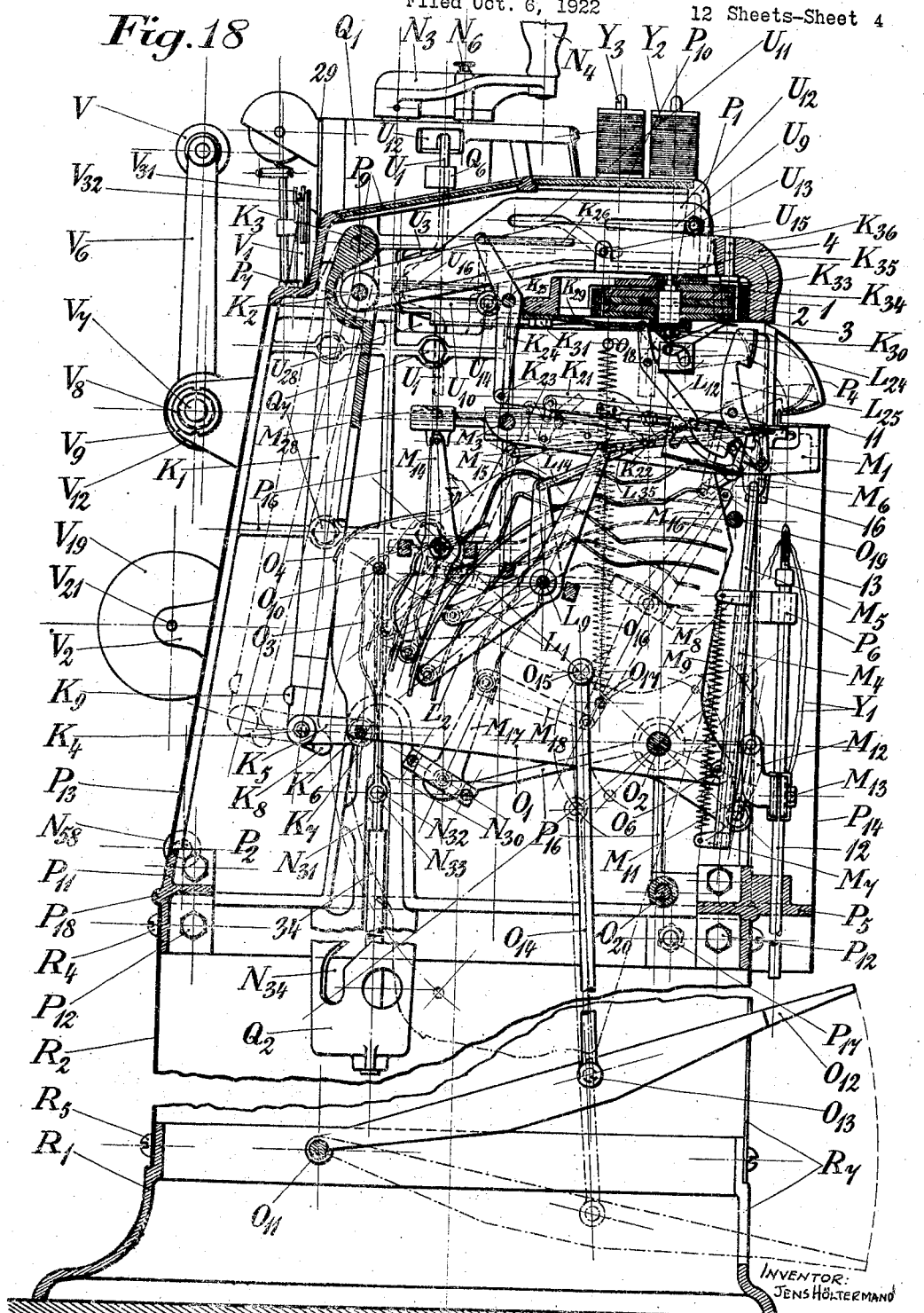

Feb. 24, 1925.

J. HÖLTERMAND 1,527,873

MARK ATTACHING MACHINE

Filed Oct. 6, 1922  12 Sheets-Sheet 5

Fig.19

INVENTOR:
JENS HÖLTERMAND
by Spear, Middleton, Donaldson & Hall Attys.

Feb. 24, 1925.
J. HÖLTERMAND
1,527,873
MARK ATTACHING MACHINE
Filed Oct. 6, 1922
12 Sheets-Sheet 6
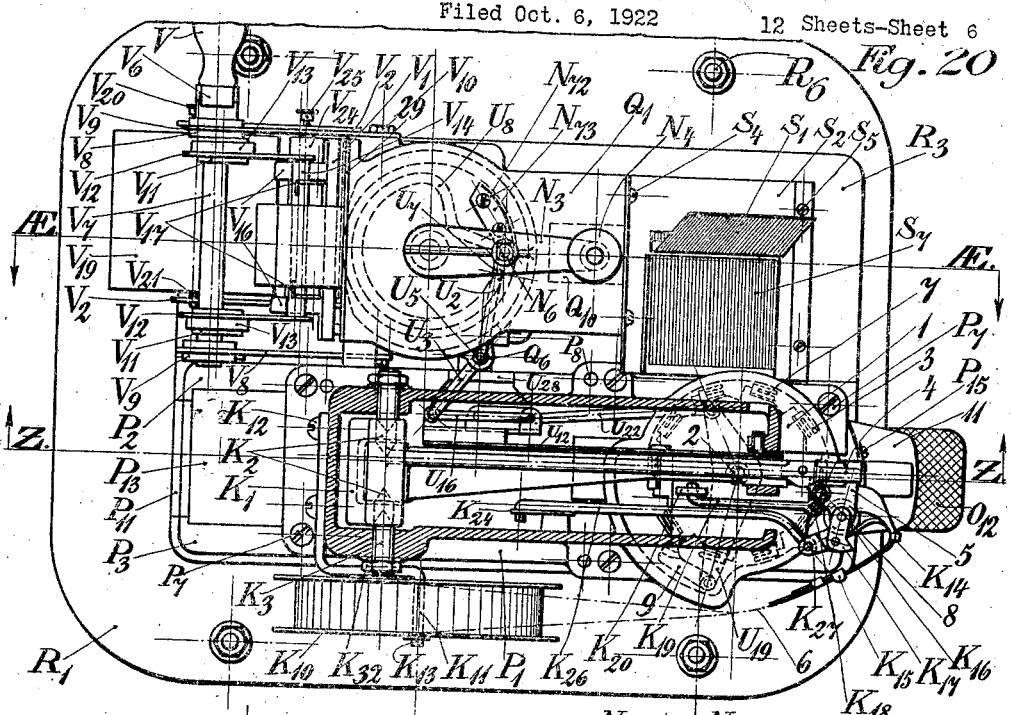
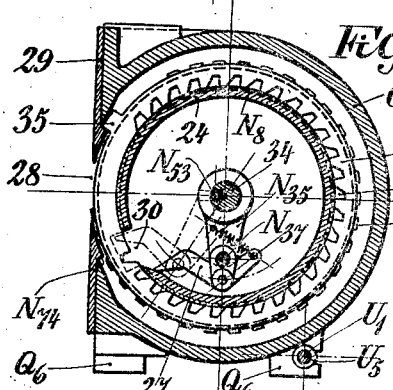
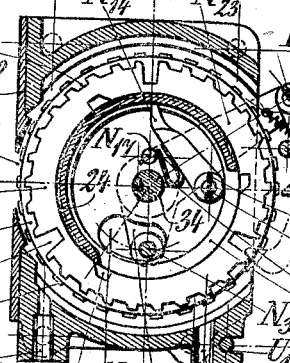
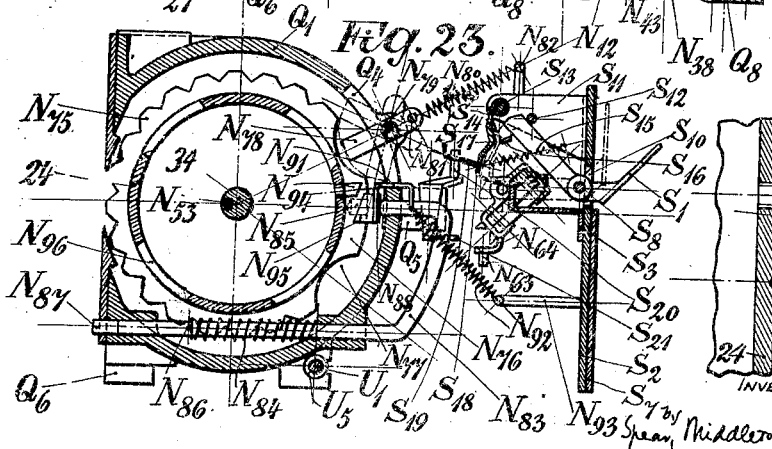
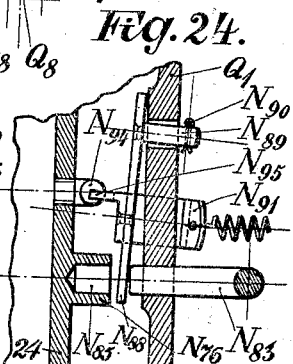

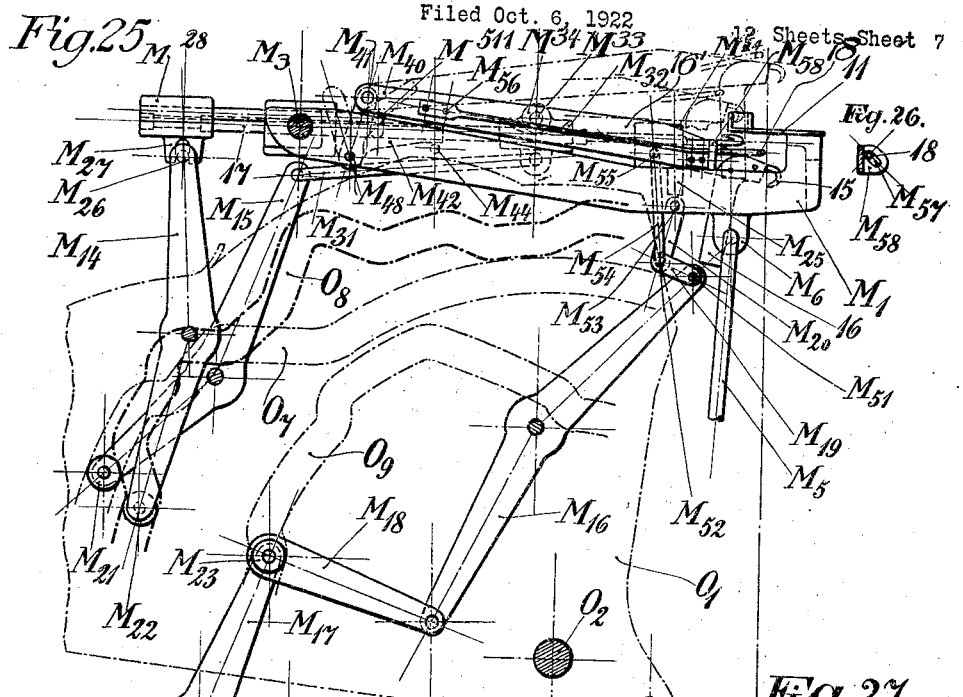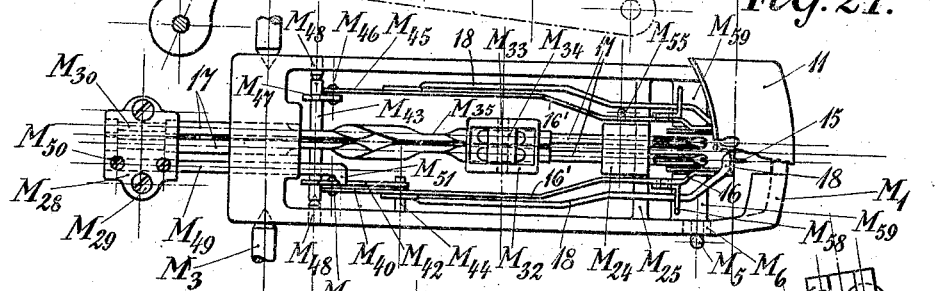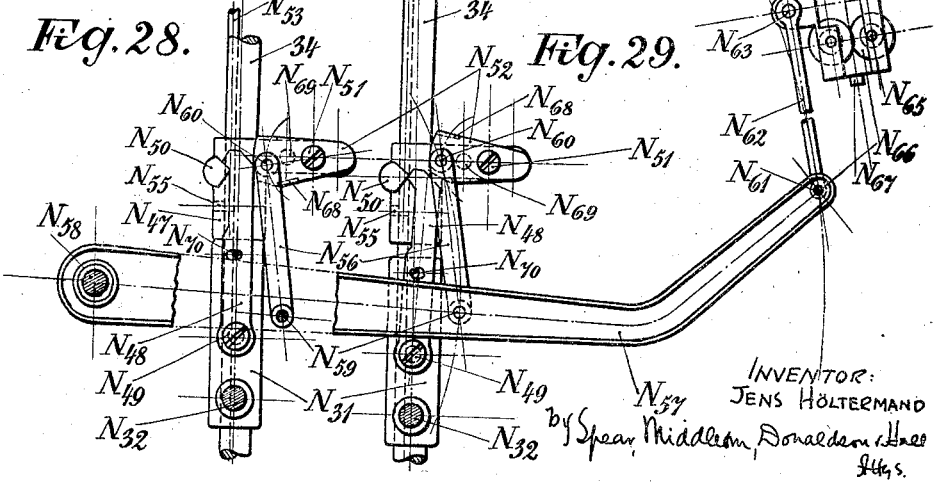

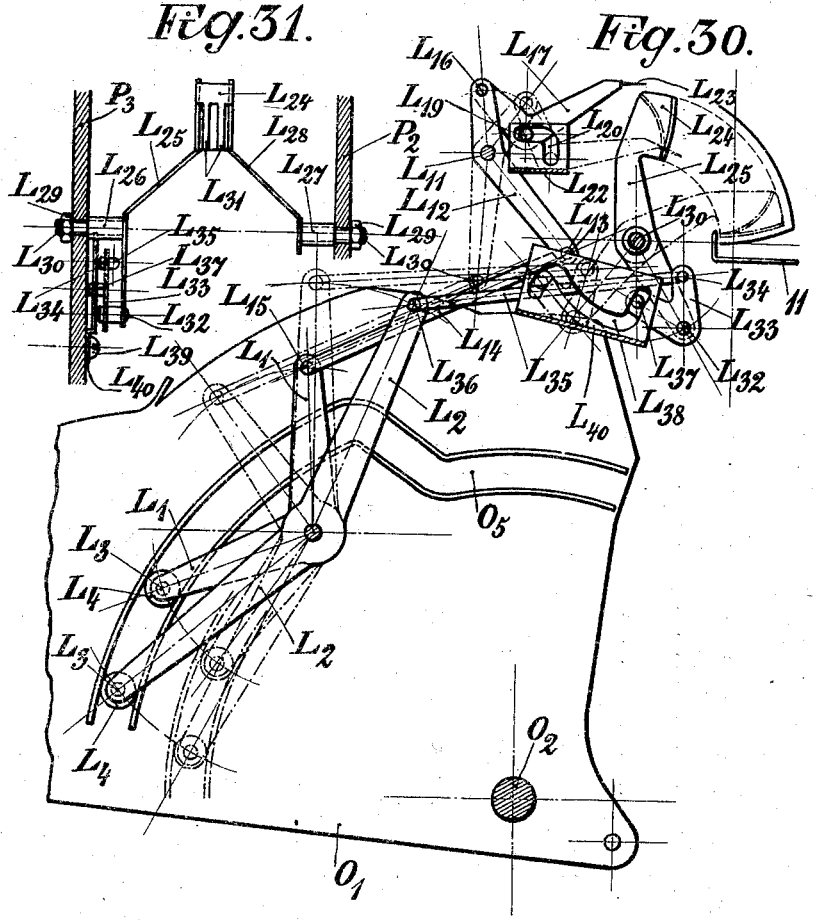

Feb. 24, 1925.
J. HÖLTERMAND
MARK ATTACHING MACHINE
Filed Oct. 6, 1922      12 Sheets-Sheet 9
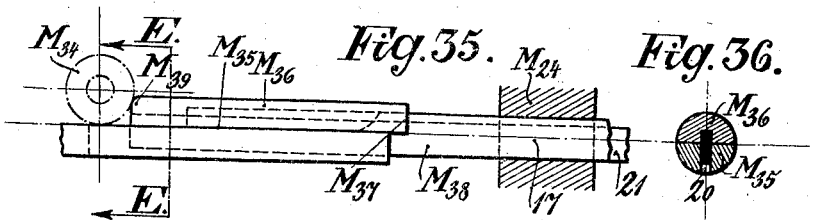
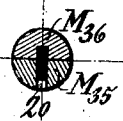
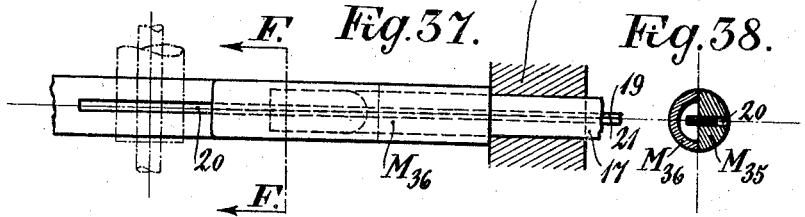
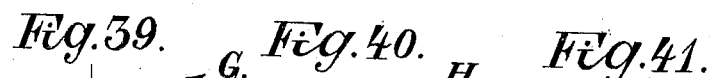
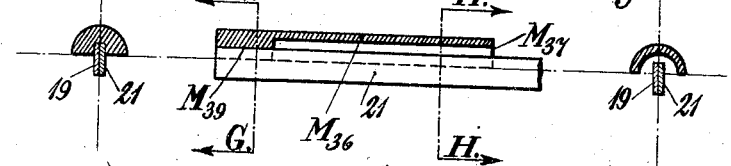
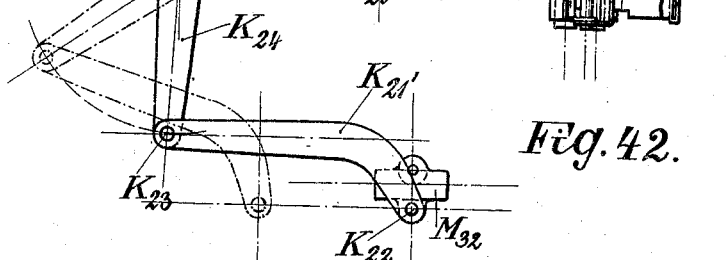
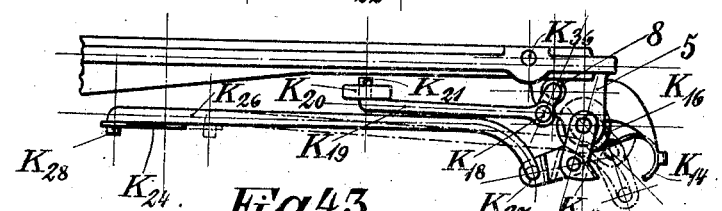
INVENTOR:
JENS HÖLTERMAND
by Spear, Middleton, Donaldson & Hall.
Attys.

Feb. 24, 1925.

J. HOLTERMAND 1,527,873

MARK ATTACHING MACHINE

Filed Oct. 6, 1922     12 Sheets-Sheet 10

INVENTOR
JENS HÖLTERMAND
By Spear, Middleton, Donaldson & Hall
Attys.

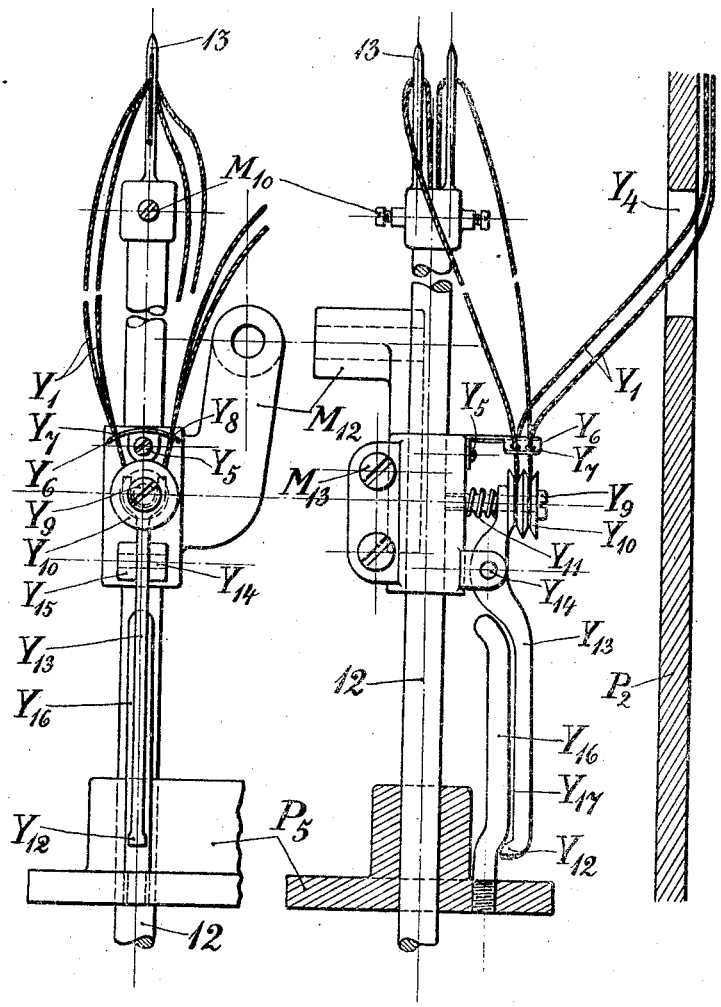

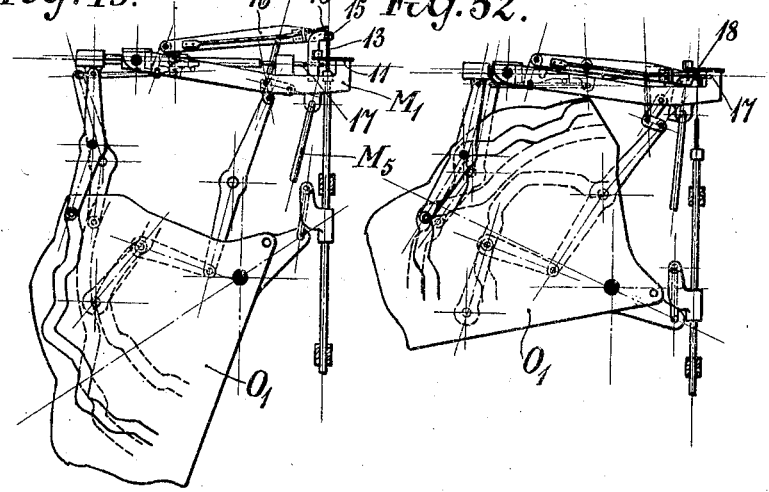

Patented Feb. 24, 1925.

1,527,873

UNITED STATES PATENT OFFICE.

JENS HÖLTERMAND, OF AARHUS, DENMARK.

MARK-ATTACHING MACHINE.

Application filed October 6, 1922. Serial No. 592,890.

*To all whom it may concern:*

Be it known that I, JENS HÖLTERMAND, mechanician, a subject of the King of Denmark, residing at Aarhus, Denmark, have invented new and useful Improvements in Mark-Attaching Machines; and I do hereby declare the following to be a full, clear, and exact description of the same.

Marking machines as hitherto used in laundries, cloth-cleansing works, dyeing works and so forth, are defective so far as they stamp a mark direct on the cloth, or on a tape or band to be sewed on the cloth by means of the hand or an ordinary sewing machine. This system requires a permanent marking of the cloth, i. e., the laundries, especially expect the linen repeatedly sent to the same laundry, and the mark once put on must be used again. The drawback of this system is that the laundry has to spend much time, and be very careful so as not to repeat the same mark, which then, naturally, would be useless. Moreover, this system requires much skill, also, as far as the sorting is concerned, the person performing the sorting having to remember where each customer's linen is placed, for, if he is to look out for every piece of linen, the sorting will be far too troublesome. Another essential drawback is that customers dislike the marking.

The machine herein specified fastens a perforated number to the cloth which is to be marked, made of fibre or other suitable material not susceptible to washing or dyeing processes, and which is easily removed. Generally the cloth is stronger than the mark tied on which can simply be torn off. Besides, the machine delivers a detailed specification of each order.

The arrangement and operation of the most essential working elements of the machine will first be described with reference to Figures 1–17, whereupon the construction of the complete machine will be fully explained.

The most important parts constituting the invention are a perforating contrivance perforating and cutting a mark from a strip of fibre which is then carried to a knotting apparatus and held firmly there as the mark is tied on to the cloth that is to be marked, and a counter specifying the contents of each order and operated in harmony with the perforator and the knotting apparatus.

The most essential parts of an embodiment of the invention are shown on the drawing, partly diagrammatically, in Figures 1–17, while Figures 18–54 show the complete machine.

Figure 1 is a vertical section of the perforator taken on the line I—I of Figure 2, parts being broken away.

Figure 2 is a plane view of the perforator, partly in section and parts being broken away.

Figure 3 shows a strip of fibre one end of which is perforated to constitute a mark.

Figures 10 and 11 show the knotter hook on a larger scale and seen from opposite sides.

Figure 12, on a still larger scale, shows the working elements of the knotting apparatus in the position immediately after the superfluous thread has been cut away.

Figures 13 and 14 are cross-sections taken on the lines C—C and D—D of Figures 10 and 11 respectively.

Figure 15 is a top view of a catch.

Figure 16 is a vertical and longitudinal section of one end of the counter.

Figure 17 is a vertical cross-section of the same.

Figure 18 is a vertical section of the complete marking machine along the line Z—Z in Fig. 20 and particularly shows the perforator and the knotting device and some details of the counter.

Figure 19 is a vertical section along the line Æ—Æ in Fig. 20 and shows the counter and part of the casing surrounding the perforator and the knotting device.

Figure 20 is a top view of the complete machine, part of the casing covering the perforator being removed.

Figures 21 and 22 are different cross-sections of the counter.

Figure 23 is a horizontal section of the counter and the key-board for operating the same.

Figure 24 is a vertical section through part of the counter.

Figure 25 is an elevation on a larger scale of the operating members of the knotter shown in Figure 18.

Figure 26 is a detail belonging thereto.

Figure 27 is a top view of the knotter shown in Figure 25.

Figures 28 and 29 are elevations of some of the counter operating members.

Figure 30 is an elevation of the picker and carrying lever which transfers the perforated marks from the perforator to the knotter.

Figure 31 is a front view of said carrying lever.

Figure 32 is a section through part of the cam sector which actuates the various mechanisms of the machine, and through part of the co-operating lever.

Figures 33 and 34 are cross-sections through one of the levers operated from said cam-sector and show the manner in which the said levers are journalled in the side frames of the machine.

Figure 35 is an elevation of part of the knotter hook and other details belonging thereto.

Figure 36 is a cross-section along the line E—E in Figure 35.

Figure 37 is a top view of the details illustrated in Figure 35.

Figure 38 is a cross-section along the line F—F in Figure 37.

Figures 39–41 show a knife, Figures 39 and 41 being cross sections along the lines G—G and H—H in Figure 40 respectively.

Figure 42 is an elevation of the knife associated with the perforator as well as the actuating means for said knife and the guiding means for the strip of the fibre.

Figure 43 is a top view of the details illustrated in Figure 42.

Figure 44:
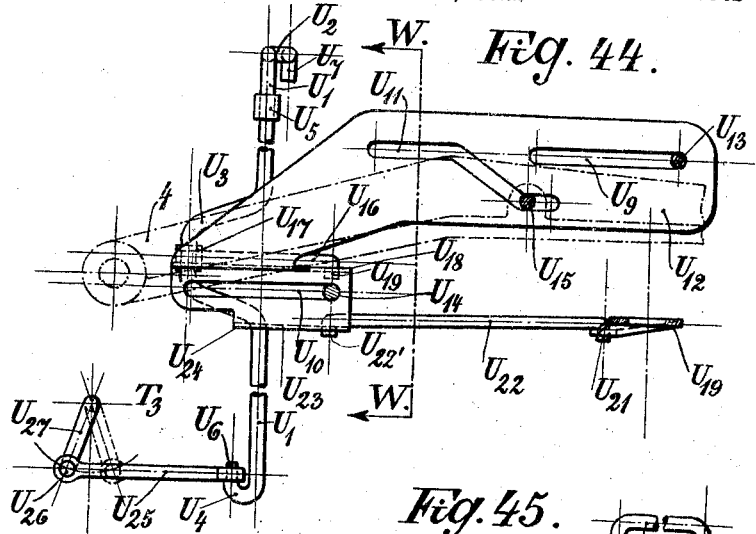

Figure 44 is an elevation of some details belonging to the perforator and the order counting device associated with the counter.

Figure 45:
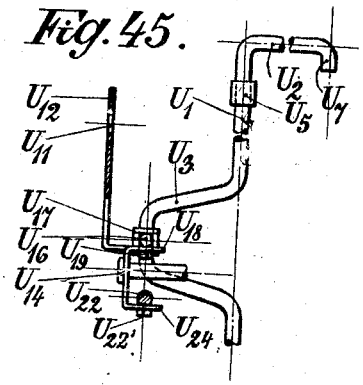

Figure 45 is a cross-section along the line W—W in Figure 44, parts being broken away.

Figure 46:
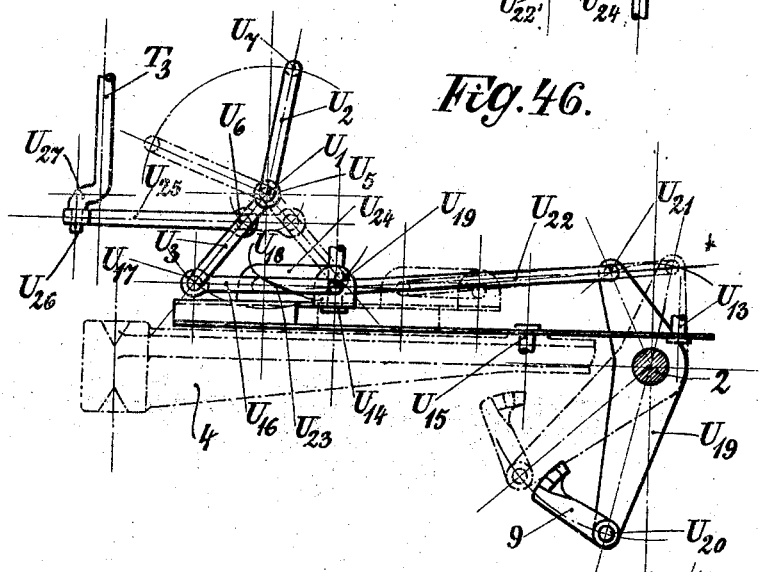

Figure 46 is a top view of the details shown in Figure 44.

Figures 47 and 48 are side view and front view respectively of the needle bar with needles and the thread guiding means.

Figures 49–54 are side elevations of the operating members of the knotter and the cam-sector shown in six different working positions substantially corresponding to the positions illustrated in the diagrammatical Figures 4–9 respectively.

The machine operates as follows: The discs 1 (Figures 1 and 2) freely turnable on a fixed shaft 2 are furnished each with ten perforating punches 3. The punches are displaceable substantial in a radial direction with respect to the discs. Finger 4 has a projection 5 through which a fibre tape 6 or other suitable material is put into a set of four vertically overlapping punches 3 at the slots 7. In discs 1 opposite punches 3 are a number of pins (not shown) arranged to mark the figure concerned while punches 3 have corresponding holes. The pins do not reach into the slot 7 when the punch is in the position shown on the drawing, but when finger 4 presses a set of punches 3 toward the centre of the discs 1 the pins will perforate tape 6, the end of which is placed in the slots 7, and perforate a number and at the same time the knife 8 will cut off the tape placed in the slots thus making a mark bearing a number as shown in Fig. 3, where A—A represents the cutting off line. The knife is made of steel tube carried on the finger 4 and containing a cylindrical piece of steel. Somewhat more than half of the sides of both are cut off in the middle so that the tape can pass between the tube and the steel into the slots 7, thus making the section a circular segment and one half of a ring. On turning the segment the tape will be cut off against the edge of the semi-circular ring. The drawing shows a perforating device with four discs 1, and the perforated mark will accordingly show four figures. All the figures on one of the discs are units, on the next tens, and so on. When the disc with the units has turned round once, the disc with tens will change its figure, and then the following discs as usual. The change is effected in the ordinary way as in automatic counters by a pawl 9.

The mark 10 (Figures 3 and 4) having been perforated and cut off as specified, the machine will carry it down to the cloth that is to be marked and which is placed on plate 11 by the operator before he starts the machine. The means used for carrying the mark down to the knotting apparatus will be described in the following and includes a reciprocating and swinging picker having a needle which when the mark is still held in the perforator picks up the mark and after the same has been released from the perforator performs its movements and transfers the mark to a swinging lever which in turn carries the mark down to the cloth placed on the plate 11. The mark is then held firmly on the cloth by said lever during the operations of the knotting apparatus. As will be understood the perforator is placed some distance above the knotting apparatus.

Figure 4:
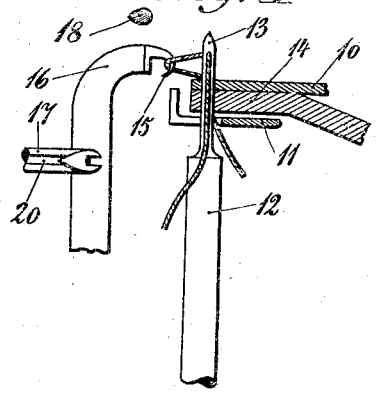
Figures 4–9 show the most important parts of the knotting apparatus with the working elements of the same in six different positions.
Figure 7:
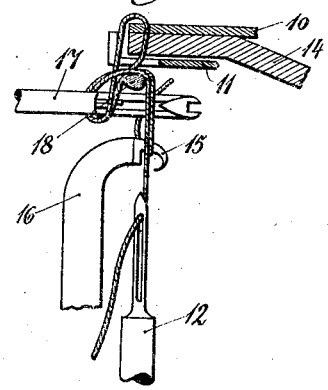
Figure 5:
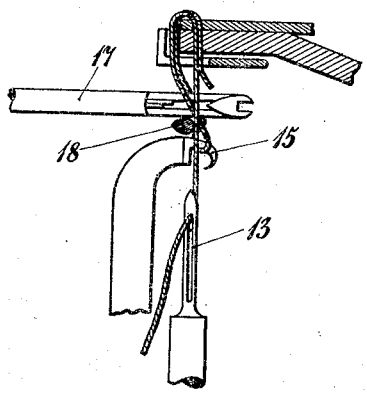
Figure 8:
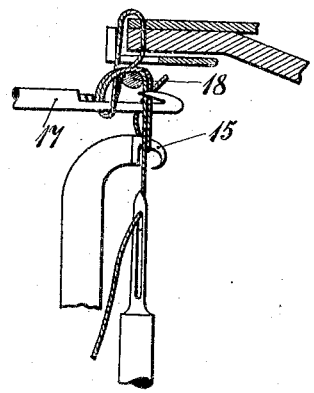
Figure 6:
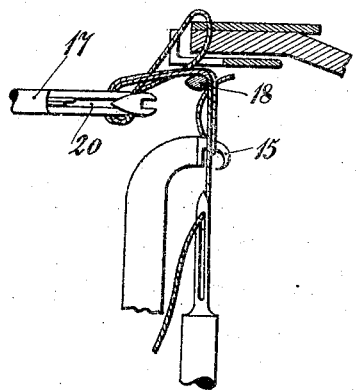
Figure 9:
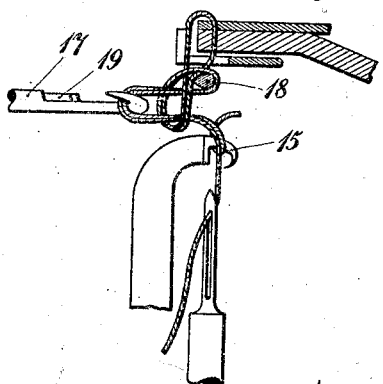

This latter apparatus comprises a needle bar 12 in which an ordinary sewing machine needle 13 is fitted which in turn will pass through cloth 14 and mark 10. When the needle has reached its highest position and again returned a little the thread will form a noose which will be caught by a hook 15 on a catch 16 which will move downward with the thread when the needle continues its downwards movements back through the cloth. When the needle has reached the position shown on Fig. 5 the knotter hook 17 will move out and then return with the double thread but only so far that the knotter finger 18 can pass vertically from its position on Figure 5 to that on Figure 6 thus lifting the double thread as seen on the drawing, while at the same time hook 17 turns round its own axis entwining the thread once. It will then be pushed through the noose made by the entwining as shown on Figure 7 and afterwards return with the double thread stretched out between finger 18 at one end and the catch and needle at the other end. When on this returning movement the point of the hook has come beneath the knotter finger 18 it will turn round one fourth so that the point of the hook turns against the knotter finger 18 as shown in Figure 8 and continuing its returning movement, it will get out of the noose of the thread (Figure 9). The plate knife 19 slides along a slot 20 in the hook, and on being moved forward, it will cut the thread placed in the hook. At the same time the knotted finger 18 will make a movement perpendicular to the plane of the drawing and will thus clear the threads. On the drawing the slot 20 of the hook 17 is larger in width relatively to the diameter of the hook than what corresponds to the real dimensions, in order to more clearly show the knife. On the back of the knife 19 shown in retracted position in Fig. 10 is a flat spring 21, somewhat longer than the knife, and consequently reaching the threads before the knife (since the knife and the spring are displaced as a whole) thus pushing them into the slot of the hook, by which method the threads of the knot will be held when the knife has cut the threads (see Figs. 11 and 12). When the hook continues its return a little longer the knot will be securely tightened. The attachment of the mark to the cloth is now complete. As shown in Fig. 10 one end of the spring 21 has a curved shaped in order that the spring may bear against the knife and press the same against the wall of the slot 20 to secure a proper cutting operation of the knife. In Fig. 11 the back of the hook 17, is shown, and the spring and knife are shown in their foremost positions. As shown in this figure the end of the spring has been straightened by the threads which are pressed in between the spring and the wall of the slot.

When the knife has cut the threads and the spring 21 holds the thread end firmly, Fig. 12, the needle 13 continues its downwards movement thereby drawing the superfluous thread 22 out from the knot. As will appear from what is stated above the thread 22 is double from the point of cutting to the hook 15 of the catch 16. It will now be of no importance whether the part of the thread 22 held by the hook 15 solely will also be drawn out from the knot by the downwards movement of the needle 13 or that part remains in the knot. The hook 15 is provided with a little spring (shown in Figure 15). When the catch 16 moves downwardly from the positions shown in Fig. 4 to that shown in Fig. 5 the thread will be caught by said little spring and held between the same and the hook 15 during the subsequent operations of the knotter, until the needle bar 12 descends from the position shown in Fig. 12, thereby taking the thread with it. Figures 4–14 only show one knotting device, while the machine is furnished with two, i. e., two needles with one thread each are fitted in the needle bar, besides the catch 16 has two hooks as shown in Figure 15, and there are two knotter hooks 17, and two knotter fingers 18. Both knotters work simultaneously, and are operated by the same gear. The purpose of two knotters is to double the security of the tying on of the mark, which by this method is tied on by two threads.

The last essential part of the machine is the counting device, the object of which is to number the articles of each customer. A number of rings 23 corresponding to the various sorts of cloth to be marked or groups of the specification are placed on a tube 24, Figures 16 and 17. The outer side of the rings are furnished with figures from one upwards. The device shown can only number eighteen pieces for every group of the specification. The inner side of the rings are furnished with teeth 25 the number and distances of which correspond to the figures 26 on the outer side, and pawl 27, which is moved whenever the machine marks one piece, turns the ring by operating on the teeth of the inner side of the rings thus making another figure appear at 28 which is a long slot in plate 29, and the figures of the ring will be level with the lower side of plate 29, a stereotype plate, on which opposite each ring is a term for the several articles in the specification to be numbered by the ring. As is evident from the drawing the tube 24 has a long slot 30 longitudinally through which the pawl 27 passes and engages with the rings. Associated with each ring is a plate ring 31, engaging with the long slot in the tube 24 by a tongue 32. Consequently the plate ring cannot turn round on the tube thus preventing the ring which is turned, from moving the adjacent ring. Space 33 is also created for the pawl 27 rendering the operation more secure and also preventing it from moving an adjacent ring. Pawl 27 is moved through bar 34, which is movable longitudinally, and marked with terms corresponding to those on plate 29. By moving the bar 34 forward or backward the pawl 27 can be made to engage with any ring, and thus number any desired detail ring, or group of the specification or of which the same may consist. When a customer's linen has been numbered an ink cushion is pressed against the plate. When a piece of a paper roll is pressed against plate 29, and then torn off it represents a specified order sheet of the linen delivered by any customer. When the contents of an order have been numbered the counting device must be replaced in its zero position. By turning tube 24 to the right round its axis on the plane of the drawing (Figure 17) the rings on the tube will also be turned. On the outer side of each ring is furnished a projection 35. If a ring has not been moved during the counting or been moved but a little it will follow the tube on being turned until the projection catches against the opposite edge of plate 29 when the tube will be turned on without the ring. A stop is furnished on the tube preventing it being turned beyond the point where the projection 35 of a ring which has not been moved during the counting catches the opposite edge of plate 29. When the tube is turned as far round as permitted by the stop all the rings will be in the same position on the tube, and on turning the tube back to the position shown on the plan all the rings will follow and the counter be in its zero position.

The specified motions of the machine are brought about by mechanisms which will now be described.

*Perforator actuating means Figures 18, 20, 42 and 43.*

As above described the perforator discs 1 rotate on a shaft 2, Figures 18 and 20, which is rigidly secured in a frame $P^1$. The finger 4, by means of which the perforating punches 3 are operated to perforate the mark, rests at one end upon the uppermost end of shaft 2 and is connected at its other end by means of conical pivots $K^2$ to a one-armed lever $K^1$ that is pivoted at its uppermost end upon conical pivots $K^3$ secured in said frame $P^1$. The lever $K^1$ can perform a small swinging movement to the left of the position shown in Figure 18, thereby displacing finger 4 in a horizontal direction. This movement of lever $K^1$ as well as the motions of the other essential working members of the machine is derived from a cam-sector $O^1$, which in Figure 18 is shown in its uppermost position and which can swing downwards approximately 80°. The manner in which the cam-sector is operated will be described later on. The cam-sector $O^1$ is pivoted upon a shaft $O^2$ which is rigidly secured in the side-plates $P^2$ and $P^3$ of the machine casing. A catch arm $K^5$ is rotatably mounted upon a stud $K^4$ secured to the lower end of lever $K^1$. Said catch arm carries upon a stud $K^6$ a roller $K^7$. When the cam-sector $O^1$ is swung downwardly this roller is engaged by a protruding edge $O^3$ arranged on one side of cam-sector $O^1$ and so formed that the lever $K^1$ is swung to the left, whereby the finger 4 is displaced and presses the punches 3 towards the perforating pins of the discs 1 so that the mark is perforated in the manner previously explained. During this swinging movement of the lever $K^1$ the catch arm $K^5$ is held in the position shown in Figure 18 by means of a projection $K^8$ on lever $K^1$. When the roller $K^7$ during the downward swing of cam-sector $O^1$ reaches a second protruding edge $O^4$ on the latter the lever $K^1$ and finger 4 are retracted to the initial position shown in Figure 18.

When the cam-sector is again moved upwardly the catch arm $K^5$ will swing in a counter clock-wise direction around its pivot $K^4$ and finally engage a second projection $K^9$ on lever $K^1$, and consequently lever $K^1$ and finger 4 will remain in the position shown in Figure 18 during the complete return stroke of cam-sector $O^1$. Thus the punches 3 are not actuated in this period.

The fibre tape 6, Figures 2 and 3, from which the marks 10 are produced, is wound upon a drum $K^{10}$, Figure 20, freely rotatable around a shaft $K^{11}$ which is secured by means of screws $K^{12}$ to the frame $P^1$. The drum is held in position upon the shaft $K^{11}$ by a split $K^{13}$. From the drum $K^{10}$ the fibre tape 6 is carried through a guiding member $K^{14}$ having a spring $K^{15}$ which serves to keep the fibre tape in an appropriate lowered position. From this guiding member $K^{14}$ the fibre tape 6 is carried between a roller $K^{16}$ journalled on the projection 5 of finger 4 and a pawl $K^{17}$ swinging on the pivot of said roller, Figures 20, 42 and 43. The pawl $K^{17}$ is provided at its inner face with small pikes (not shown) which when the pawl is swung toward the left, Figure 43, engage the fibre tape and move the end of the same through the knife 8 previously described and into the slots 7, Figure 20, of the perforating punches 3. At the movement of finger 4 to the left hand side the cutting of the fibre tape is effected simultaneously with the perforating of the mark, since the above mentioned rotatable cutting segment of knife 8 is provided with a crank $K^{18}$ which is connected to a rod $K^{19}$, the bent end of which loosely engages an aperture in a lug $K^{20}$ formed on the frame $P^1$, Figure 20. The rod $K^{19}$ is prevented from disengaging lug $K^{20}$ by a split $K^{21}$. The loose engagement between rod $K^{19}$ and lug $K^{20}$ enables the former to swing through a small angle in a horizontal direction. As explained above, the knife 8 is mounted on the projection 5 of the finger 4, and thus when the latter is moved to the left, Figure 42, the knife 8 is moved bodily in the same direction, whereby crank $K^{18}$ operates the cutting segment of the knife to cut off the perforated mark from the fibre tape.

The movement of the pawl $K^{17}$ is effected by the motions of a horizontally reciprocating member $M^{32}$ (which co-acts with the knotter hooks and will be further described in the following). A stud $K^{22}$ on said member $M^{32}$ is connected by a link $K^{21'}$ to a stud $K^{23}$ on one arm of a two-armed lever $K^{24}$ freely turnable on a shaft $K^{25}$ which is rigidly secured in the frame $P^1$ of the machine. Said lever is connected by a rod $K^{26}$ to an arm $K^{27}$ rigidly mounted on pawl $K^{17}$. When link $K^{21'}$ during a double-stroke of member $M^{32}$ is moved from the position shown in full lines in Figure 42 to the position shown in dotted lines and back again, the pawl $K^{17}$ is moved from the position shown in full lines in Figure 43 to that shown in dotted lines and back again, and hereby is the fibre tape advanced in the manner explained above. $K^{28}$ are splits inserted through holes in the bent ends of the rod $K^{26}$.

Immediately above the series of perforator discs 1 there is arranged a plate $K^{33}$, Figure 18, which is secured to the frame $P^1$ and provided with a plurality of pins (not shown), which when the finger 4 is displaced towards the left hand side co-act with apertures formed in a radially displaceable punch $K^{34}$ whereby a designating figure such as a number or a letter is perforated in the mark in addition to the number perforated by the punches 3. This designating figure is individual for each marking machine, so that no confusion can arise in the case of more marking machines being used in the same laundry.

The lowermost end of shaft 2 is inserted through a hole in a plate $K^{29}$, Figure 18, and clamped to this plate with screw nuts $K^{30}$, while the plate in turn is fastened to the frame $P^1$ by means of a screw $K^{31}$.

The conical pivots $K^3$, Figure 20 are axially adjustable and can be clamped to the frame $P^1$ by nuts $K^{32}$; the conical pivots $K^2$ are in a similar manner clamped to the lever $K^1$. To retract the perforating punches 3 and $K^{34}$ to the initial inactive position a stud $K^{36}$, Figure 18, is by means of pins $K^{35}$ secured to the displaceable finger 4 and works in slots in the discs 1 and the plate $K^{33}$. When the finger 4 is moved to the right, this stud $K^{36}$ forces the perforating punches 3 and $K^{34}$ away from the discs 1 and the plate $K^{33}$, so that the perforating pins (not shown) are retracted from the slots 7 and the perforated mark 10 (Figures 1–3), whereupon the latter is picked up by the needle of a picker (to be described in the following) and carried away to the knotting apparatus.

*The mark carrying mechanism, Figures 18, 19, 30–32 and 34.*

The cam-sector $O^1$ is provided at one side with a cam groove $O^5$, Figures 30 and 32, engaged by rollers $L^4$, journalled on studs $L^3$ which are secured to levers $L^1$ and $L^2$ respectively. These levers are pivoted as shown in Figure 34 to a side plate $P^3$, forming part of the machine casing. Two lugs $L^5$ are formed integral with the side plate $P^3$ and carry by means of screws $L^6$ a transverse piece $L^7$ to which is riveted a conical pivot $L^8$. A shaft $L^9$ to which the lever $L^1$ is rigidly secured is journalled at one end by means of pivot $L^8$ and bears with its other conical end in a corresponding conical recess in side plate $P^3$. The lever $L^2$ is mounted to swing freely upon shaft $L^9$ between a shoulder $L^{10}$ formed on the latter and the lever $L^1$. Between the side plates $P^2$ and $P^3$ there is secured a shaft $L^{11}$, Figure 30, on which a lever $L^{12}$ is mounted which is arranged to swing 40°. The lever $L^{12}$ is by means of a pin $L^{13}$ connected to a rod $L^{14}$ which in its opposite end is connected to lever $L^1$ by a pin $L^{15}$. The lever $L^{12}$ is by means of a pin $L^{16}$ pivotally connected to a picker $L^{17}$ which carries a short shaft $L^{19}$ the free ends of which extend on opposite sides of the picker. These free ends of shaft $L^{19}$ are adapted to work in angular slots $L^{20}$ produced in small angle plates $L^{22}$ (one on each side of the picker) that are secured by means of screws $L^{21}$ (Figure 19) to the inner sides of the side plates $P^2$ and $P^3$ respectively, so that shaft $L^{19}$ can be displaced horizontally and vertically in said slots whereby the picker is moved from the position shown in full lines in Figures 18 and 30 to the position shown in dotted lines. The picker $L^{17}$ carries a needle $L^{23}$ which in the proper movement is stuck into the perforated mark and transfers the same to the mark carrying basket $L^{24}$ which is positioned upon one end of a double-armed lever $L^{25}$. The basket is also supported upon a supporting arm $L^{28}$, Figure 31. The lever $L^{25}$ and the arm $L^{28}$ are provided each with a sleeve $L^{26}$ and $L^{27}$ respectively which are rotatably mounted upon pivots $L^{30}$. These pivots are clamped to the side plates $P^2$ and $P^3$ respectively by means of nuts $L^{29}$. The perforated mark is delivered from the picker needle into the basket $L^{24}$ and held firmly therein by means of the flat springs $L^{31}$. The lowermost end of lever $L^{25}$ carries by means of a pivot $L^{32}$ a bell crank lever $L^{33}$ one arm of which is connected by pivot $L^{34}$ to a rod $L^{35}$ which by a pivot $L^{36}$ is connected to the upper arm of lever $L^2$ as clearly shown in Figure 30. The other arm of lever $L^{33}$ is provided with a projection $L^{37}$ engaging a slot $L^{38}$ formed in a plate $L^{40}$ which by means of screws $L^{39}$, Figure 31, is secured to the side plate $P^3$. When the cam sector $O^1$ is swung downwardly the rollers $L^4$ run in the cam groove $O^5$, and thereby the levers $L^1$ and $L^2$ are moved to the positions shown in dotted lines. In operation the picker $L^{17}$ is first moved bodily in horizontal direction so as to pick up the perforated mark and then swung and displaced vertically to deliver the mark into the basket $L^{24}$, whereupon the latter is swung downwardly to the position shown in dotted lines above the plate 11 and and held there until the mark has been tied on to the cloth. The picker $L^{17}$ and the lever $L^{25}$ thereafter at the return stroke of cam sector $O^1$ are moved back to their initial positions.

The knotting apparatus.

Figures 4–9, 12, 18, 19, 25–27, 33, 35–41 and 47–54.

As explained above with reference to Figures 4–15 the knotting apparatus includes a plate 11 upon which the cloth to be marked is placed. This plate 11, Figures 18, 25 and 27, is carried upon the outer end of a swingable knotter frame $M^1$ which is pivoted at its inner end upon conical pivots $M^3$ clamped to the side plates $P^2$ and $P^3$ by means of screw nuts $M^2$ (Figure 19). The outer end of the knotter frame $M^1$ may swing up and down towards and away from a noose $P^4$, Figure 18, which is secured to the side plates $P^2$ and $P^3$, so that the cloth to be marked is held firmly between plate 11 and noose $P^4$ during the knotting operation. The oscillations of the knotter frame $M^1$ is effected by means of cam sector $O^1$ which is provided with a stud $O^6$ forming the pivot for a tube $M^4$ through which a rod $M^5$ may slide. This rod forms a supporting means for the knotter frame, since the upper end of the rod is pivotally connected to a lug formed upon the under side of the frame. The rod $M^5$ and the tube $M^4$ are provided with lugs $M^7$ and $M^8$ respectively which are interconnected by a spring $M^9$ so that the lug $M^7$ will normally be pressed against the extreme lowermost end of tube $M^4$. When the cam sector $O^1$ is swung downwardly the stud $O^6$ is raised whereby the knotter frame is swung upwardly until plate 11 presses the cloth to be marked against noose $P^4$, and during the balance of the downward stroke of cam sector $O^1$ the rod $M^5$ remains stationary while the spring $M^9$ is stretched. At the return stroke of the cam sector the spring $M^9$ maintains the plate 11 in its elevated active position until the lowermost end of tube $M^4$ engages the lug $M^7$ on rod $M^5$, whereupon the knotter frame $M^1$ is retracted to its lower initial position.

The needle bar 12, Figures 18, 47 and 48, in which the needles 13 are secured by means of set screws $M^{10}$ is guided at its lower end in a guide $P^5$ formed on the machine casing, while the upper end of the needle bar is guided in a guide $P^6$ cast integrally with the side plate $P^2$. The needle bar is reciprocated in a vertical direction by means of a connecting rod $M^{11}$, Figure 18, which is pivotally connected to the lowermost end of cam sector $O^1$ and to a sleeve $M^{12}$ clamped to the needle bar by means of screws $M^{13}$.

As mentioned above the machine is preferably provided with two catching hooks 15 (carried by catch 16), two knotter hooks 17 and two knotter fingers 18. The above described motions of these operating members as well as the motions of the plate knives 19 and the flat springs 21 are all effected by the cam sector $O^1$, Figure 25 by means of levers $M^{14}$, $M^{15}$ and $M^{16}$ and links $M^{17}$, $M^{18}$, $M^{19}$ and $M^{20}$ connected to the last named lever. The levers $M^{14}$ and $M^{15}$ and the link $M^{17}$ are provided with rollers $M^{22}$, $M^{21}$ and $M^{23}$ respectively which engage cam grooves $O^8$, $O^7$ and $O^9$ formed on the cam sector $O^1$. The arrangement of the cam grooves and the rollers is similar to that shown in Figure 32. The lever $M^{14}$ is pivotally mounted on the side plate $P^3$ in the manner shown in Figure 33, while the levers $M^{15}$ and $M^{16}$ in a similar manner are pivotally mounted on the side plate $P^2$. Each knotter hook 17 is slidably and rotatably mounted at its outer end in block $M^{24}$, Figure 27, formed on a web $M^{25}$ which connects the side members of knotter frame $M^1$ with each other and at its inner end in a block forming the innermost part of the knotter frame. The lever $M^{14}$ is provided at its upper end with a pin $M^{26}$ which engages a bifurcated member $M^{27}$ formed on a two-part member $M^{28}$, the two parts of which are secured to each other by means of screws $M^{29}$ and embrace the inner ends of the knotter hooks 17. Both of these knotter hooks are provided with a reduced portion $M^{30}$ so seated in the member $M^{28}$, that the knotter hooks can turn freely in said member, but will reciprocate with the same when lever $M^{14}$ is swung. The rotary motions of the knotter hooks 17 are effected by means of the lever $M^{15}$ which through a connecting rod $M^{31}$ is connected to a sleeve $M^{32}$. In the upper side of this sleeve there is formed a recess in which a roller $M^{34}$ is accommodated which is journalled on a short shaft $M^{33}$ and bears against screw threaded portions $M^{35}$ of the knotter hooks 17. Thus it will be understood that the member $M^{32}$ constitutes a kind of antifriction screw nut which when displaced horizontally through the action of the lever $M^{15}$ will bring the knotter hooks to perform turning movements.

As explained above with reference to the diagrammatical Figures 10–14 each knotter hook 17 is provided with a plate knife 19 and a flat spring 21. The purpose and operation of these members have been fully explained above, and their actuating means will now be described with reference to Figures 35–41. The knife 19 and the flat spring 21 are secured to a slide $M^{36}$ which bears with its outer end $M^{37}$ on the reduced cylindrical portion $M^{38}$ of the knotter hook and with its inner end $M^{39}$ on the cylindrical end portion of the screw threaded portion $M^{35}$ of the knotter hook. When the roller $M^{34}$ at the outward stroke of member $M^{32}$ engages the inner end $M^{39}$ of slide $M^{36}$ as shown in Figure 35 the slide with knife 19 and spring 21 is displaced towards the right hand side relative to the knotter hook whereby the thread will be cut in the manner previously described. After the cutting operation the knife will be retracted by the end $M^{37}$ of the slide impinging against the block $M^{24}$ of the knotter frame, and as the knotter hook 17 is still moved to the right hand side the slide $M^{36}$ with the knife 19 and the spring 21 will remain stationary with respect to the knotter frame, and hereby the knife is retracted from the loop formed on the end of the knotter hook as explained above with reference to Figure 12.

The catch 16, which carries the hooks 15, Figures 25 and 27, is secured on the outer portion of a stirrup member 16′, one end $M^{40}$ of which is by means of stud $M^{41}$ pivoted to one arm of a bell crank lever $M^{42}$ secured on shaft $M^{43}$, while the other end $M^{45}$ of the stirrup member 16′ by a stud $M^{46}$ is pivotally connected to an arm $M^{47}$ on shaft $M^{43}$. In the position shown in Figure 25 the other arm of lever $M^{42}$ bears against a projection $M^{44}$ on knotter frame $M^{1}$. The shaft $M^{43}$ with the ball crank lever $M^{42}$ and the arm $M^{47}$ is journalled on the conical pivots $M^{48}$ secured in frame $M^{1}$. The stirrup member 16′ carrying the hooks 15 is so guided and actuated that it can move from the lowered position shown in Figure 25 through a substantial semi-circular path to the elevated position shown in dot and dash lines in Figure 25 and back again, whereby the hooks 15 pass the left hand end of plate 11. To this end an actuating bar $M^{49}$ which is rigidly secured in member $M^{28}$ by means of screws $M^{50}$ and slides freely through a hole in the inner end of frame $M^{1}$ is provided at its outer end with a finger $M^{511}$ which is arranged to actuate the vertical arm of bell crank lever $M^{42}$, so that this lever is swung in a counter clock-wise direction, Figure 25, when member $M^{28}$ is displaced toward the left by means of lever $M^{14}$. The vertical motion of stirrup member 16′ is effected by means of roller $M^{23}$, link $M^{18}$, lever $M^{16}$ and link $M^{19}$ pivoted at one end by means of a stud $M^{51}$ to lever $M^{16}$ and at the opposite end by means of stud $M^{52}$ to link $M^{20}$ which swings on pivot $M^{53}$ mounted on knotter frame $M^{1}$. The stud $M^{52}$ is pivotally connected to a lifting rod $M^{54}$ the upper end of which is connected to a pivot $M^{55}$ that is rigidly secured on stirrup member 16′. At the downward stroke of cam sector $O^{1}$ the roller $M^{23}$ runs in cam groove $O^{5}$, whereby the lifting rod $M^{54}$ will raise stirrup member 16′, and simultaneously the member $M^{28}$ is displaced toward the left. In this way the desired horizontal and vertical motions are imparted to the stirrup member 16′ so as to move the catching hooks 15 through the path mentioned above.

The knotter fingers 18 are by means of screws $M^{56}$ secured to the two legs of stirrup member 16′ and guided each through an inclined slot $M^{57}$, Figure 26, produced in an angle plate $M^{58}$ secured on stirrup member 16′. Each knotter finger 18 is retracted from the knot (by which the mark is secured to the cloth) in that way that the knotter finger at the upward stroke of stirrup member 16′ impinges against the bottom of plate 11 whereby the knotter finger which is sufficiently yieldable is forced downwardly and outwardly in slot $M^{57}$.

The downwardly extending part of catch 16 is guided between two lugs $M^{59}$, Figure 27, on knotter frame $M^{1}$.

In Figure 25 the position of cam-sector $O^{1}$ shown in dot and dash lines and the positions of the knotter elements shown in full lines correspond to the initial position of the machine when inactive. When the cam-sector is swung downwardly the thread is carried by the needle 13 on the needle bar through a slot in plate 11 and through the cloth 14 and the perforated mark 10 which is to be tied on to the cloth. Figures 49–54 illustrate the various positions of the cam-sector $O^{1}$ and the knotter elements during the following return stroke (upward stroke) of the cam-sector and the downward stroke of the needle bar. In this period the knot is formed. Figure 49 shows that the cam-sector $O^{1}$ has been swung upwardly from its extreme lowered position, in which moment the hook 15 is ready to grasp the loop formed upon the thread (not shown) by the initial downward stroke of the needle bar and to carry this loop beyond the left hand end of plate 11. A moment later the parts occupy the positions shown in the diagrammatical Figure 4. In Figure 50 the cam-sector has been swung 40° upwardly from its lowered position. This figure corresponds to the diagrammatical Figure 5, in which the hook 15 has carried the loop downwardly and the knotter hook 17 has been moved to the extreme left position in order to be ready to carry the thread above the knotter finger 18. In Figure 51 the cam sector $O^{1}$ has been swung 52° upwardly from its extreme lower position, and this figure corresponds to the diagrammatical Figure 6, in which the knotter hook 17 has been moved towards the left while the knotter finger 18 has been moved upwardly. In Figure 52 the cam-sector has been moved 62° upwardly, and the knotter elements now occupy the positions shown in Figure 7, in which the knotter hook 17 has been moved towards the right below the knotter finger 18. Figure 53 shows the position in which the cam-sector has been swung 70° upwardly from its extreme lowered position. The knotter hook now as illustrated in Figure 8 has engaged the threads and performed a slight turning movement, so that it is clear to be moved towards the left and draw the threads through the loop already formed around the knotter hook 17. In Figure 54 the cam-sector $O^1$ has been swung upwardly 76° which position corresponds to Figure 9. During the last part of the upward stroke of the cam-sector from the position shown in Figure 54 to that shown in Fig. 25, which part will amount to 40°, the knife 19 as shown in the diagrammatical Figure 12 is advanced in the knotter hook and cuts the thread, since the roller $M^{34}$, Figure 35, stops the knife carrying slide $M^{36}$ and keeps the knife stationary while the knotter hook 17 is still moved towards the left to tighten the knot. Simultaneously the knotter frame $M^1$ is lowered by means of rod $M^5$, Figures 18 and 25, and the stirrup member 16' which carries the knotter fingers 18 is moved upwardly whereby the knotter fingers strike the under side of plate 11, so that the knotter fingers are retracted from the knots as described above with references to Figure 26. The cam sector $O^1$ has now completed its double-stroke, and the perforated mark has been tied on to the cloth by two separate knots.

*The counter.*

*Figures 16-24, 28-29.*

As explained above with reference to the diagrammatical Figures 16 and 17 the counter comprises a tube 24, Figures 19 and 21, upon which the numeral rings 23 may be turned by means of pawl 27 which engages the teeth 25 of the numeral rings to bring the desired figure 26 on the periphery of the ring to the position opposite the slot 28, Figure 21, in the stereotypic plate 29. The tube 24 is supported at its lower end upon the stationary frame member $Q^2$, Figure 19, and is provided at its upper end with an end wall having a hollow hub $N^1$ which is guided in the top portion of the counter casing $Q^1$ and outside the latter is furnished with a hand operated crank $N^3$ that is secured to the hub by a pin $N^2$ and provided with a handle $N^4$, so that the tube 24 may be turned by hand. When the counter operates, the tube 24 should be locked in the position shown in Figures 19-24, and for this purpose crank $N^3$ is provided with a spring pressed pawl $N^5$, Figure 19, which engages a depression formed in the upper side of the counter casing $Q^1$. The pawl $N^5$ is provided with a head $N^6$ by means of which the pawl may be lifted to thereby release crank $N^3$ and tube 24. The plate rings 31 arranged alternately with the numeral rings 23 are provided at their inner periphery with projections (not shown) which fit in circumferential grooves $N^7$ formed in the outer surface of tube 24. When the counter is assembled these projections on the rings 31 are inserted from below the tube 24 into longitudinal grooves $N^8$, Fig. 21, formed in the outer surface of the tube, and the ring 31 is then lifted up to the desired position and given a small turning movement whereby said projections on the inner periphery of the ring engage the desired circumferential groove $N^7$, so that the ring 31 is held in position on tube 24. It will be understood that each plate ring 31 carries the numeral ring 23 positioned immediately above the plate ring. With this arrangement each ring 23 can easily be turned independently of the other numeral rings by engagement with the selectively and axially adjustable pawl 27.

The machine is also provided with an additional counter which counts the total sum of the figures presented by the rings 23 in slot 28. For this purpose the lowermost reduced end of tube 24, Fig. 19, carries three additional numeral rings $N^9$ supported by plate rings $N^{10}$. The construction and mounting of these rings $N^9$ and $N^{10}$ is quite similar to that of the rings 23 and 31, so that each numeral ring $N^9$ may be turned independently of the other numeral rings $N^9$. Each numeral $N^9$ is provided at its outer periphery with thirty figures $N^{11}$ (three sets of digits from 0 to 9) Figure 22, and at its inner periphery with three recesses $N^{12}$ each of which may be engaged by a pawl $N^{14}$ which is pivoted upon a stud $N^{13}$ and serve to reset the rings $N^9$ into the zero positions before the counter is to start a fresh counting operation. The stud $N^{13}$ is secured to the frame member $Q^2$ and provided with a split $N^{15}$, which serves to maintain the pawls $N^{14}$ in position. The pawls $N^{14}$ are pressed yieldingly outwardly by means of springs $N^{16}$ one end of which is secured in a stud $N^{17}$ carried by the frame member $Q^2$, while the other end of the spring bears against the rear side of the pawl as clearly shown in Figure 22. Opposite to the pawls $N^{14}$ there is produced an opening $N^{18}$, Figure 22, in the tube 24 so that when the latter is turned around its axis the pawls $N^{14}$ will engage those recesses $N^{12}$ which first appear in the opening $N^{18}$, whereby the numeral rings $N^9$ are carried to the zero positions, whereupon the tube 24 is turned back again to its initial position. Hereby pawl $N^{14}$ and ring $N^9$ will be adjusted in the position shown in Figure 22.

To the upper surface of each ring $N^9$ there is riveted a ratchet wheel $N^{19}$ having 27 notches $N^{20}$ and three uniformly spaced deeper notches $N^{21}$ in order that a swinging pawl $N^{22}$ may turn the three rings $N^9$ in the well known manner so that the additional counter formed by the rings $N^9$ will be able to count sums from 0 to 999. For this purpose pawl $N^{22}$ has a stepped engaging face and normally only engages the numeral ring $N^9$ of the lowermost order, while the notches $N^{21}$ are provided for enabling the pawl to engage numeral rings of higher orders as is well known. Pawl $N^{22}$ is mounted by means of pivot $N^{24}$ upon an arm $N^{23}$ and held in position by a split $N^{25}$. The pawl is pressed yieldingly towards the ratchet wheel by means of a spring $N^{26}$ one end of which is connected to the pawl by a pin $N^{27}$, while the opposite end of the spring by a pin $N^{28}$ is connected to the pawl carrying arm $N^{23}$. The swing of pawl $N^{22}$ being greater than what corresponds to the ratchet wheel being advanced one tooth-space the counter casing $Q^1$ is provided with a stud $N^{29}$ which during part of the swing of the pawl prevents the same from engaging the ratchet wheel $N^{19}$ with the result that by each active swing of the pawl the ratchet wheel is only advanced one tooth-space.

The pawls 27 and $N^{22}$ are operated from the cam sector $O^1$ at the last part of the downward swing of the same. The cam sector is provided with a projection $O^{10}$, Figure 18, to which is pivotally connected a rod $N^{30}$ which is connected at its other end to a pivot $N^{32}$ secured on a sleeve $N^{31}$ which is arranged to slide vertically on the shaft 34. The pivot $N^{32}$ is provided with a roller $N^{33}$, engaging a slot $N^{34}$ in frame member $O^2$. At the end of the downward stroke of cam sector $O^1$ and sleeve $N^{31}$ the roller $N^{33}$ enters an inclined part of slot $N^{34}$, and hereby shaft 34 and the pawl carrying arms $N^{35}$ (Figure 21) and $N^{23}$ (Figure 22) carried on said shaft will perform a turning movement, whereby the pawls 27 and $N^{22}$ will advance the numeral rings 23 and $N^9$ respectively.

The pawl carrying arm $N^{23}$, Figure 19, is rigidly secured on shaft 34 by means of a transverse pin $N^{36}$. The pawl carrying arms $N^{23}$ and $N^{35}$ are connected to each other by means of a rod $N^{37}$ which is secured at its lowermost end in an arm $N^{38}$, Figure 22, formed on pawl arm $N^{23}$. The rod $N^{37}$ further passes through a circular slot $N^{43}$ in the top portion of frame member $Q^2$ and slides freely through a hole formed in pawl arm $N^{35}$, Figure 21, whereas the uppermost end of rod $N^{37}$ is secured to an arm $N^{40}$, Figure 19, which is rigidly mounted on shaft 34 by means of a split $N^{39}$. It is hereby obtained that arm $N^{35}$ carrying the pawl 27 is free to slide vertically on shaft 34, while the arm is compelled to follow the turning movements of the shaft.

The pawl carrying arm $N^{23}$, Figure 19, and the sleeve $N^{31}$ are connected to each other by means of a similar rod $N^{41}$, the upper end of which is secured to an arm $N^{42}$ on the arm $N^{23}$, while the lowermost end of rod $N^{41}$ is secured to an arm $N^{46}$ rigidly mounted on shaft 34 by means of a pin $N^{45}$. The rod $N^{41}$ further passes freely through a hole in an arm $N^{44}$ projecting from sleeve $N^{31}$. With this construction sleeve $N^{31}$ is free to slide vertically on shaft 34, while the later is compelled to follow the turning movements of the sleeve. The upper end of shaft 34 is guided in a bore in hub $N^1$, while the central part of the shaft and the lowermost end are guided in the frame member $Q^2$. The shaft 34 is suspended by means of the above mentioned arm $N^{46}$ which bears against the bearing $Q^3$ formed on the lowermost end of frame member $Q^2$.

As above mentioned the pawl 27 is adjustable in vertical direction so that the pawl may be brought to engage any desired numeral ring 23. The vertical adjustment of pawl 27 is controlled by keys $S^1$ and actually effected by means of sleeve $N^{31}$, but since the latter always performs full strokes up and down means must be provided for releasing pawl 27 from sleeve $N^{31}$ when the pawl reaches the desired numeral ring. The construction and operation of the keys $S^1$ with associated parts will be fully described in the following, but it is to be remarked here, that each key corresponds to a separate group of clothes, and when a key is depressed and a carriage $N^{64}$ is moved downwardly at the downward stroke of cam sector $O^1$ and sleeve $N^{31}$ the motion of said carriage will stop when it reaches the depressed key, and then the carriage through certain operating members releases the driving connection between pawl 27 and sleeve $N^{31}$ so that the pawl is stopped in a position corresponding to the depressed key.

The means for obtaining this result will now be described. The arm $N^{35}$ carrying the pawl 27 is by means of a rod $N^{53}$, Figures 19, 28 and 29, connected to a sleeve $N^{47}$ loosely mounted on shaft 34 above sleeve $N^{31}$. The rod $N^{53}$ is slidable in a longitudinal groove formed in shaft 34, Figures 21 and 23, and is provided at its upper end with a hook $N^{54}$, Figure 19, which engages pawl carrying arm $N^{35}$, while the rod $N^{53}$ at its lowermost end is furnished with a hook $N^{55}$, Figures 28 and 29, which engages an elongated horizontal slot in sleeve $N^{47}$ so that the latter may remain unaffected by the turning movements of shaft 34, and on the other hand pawl carrying arm $N^{35}$ and sleeve $N^{47}$ will move vertically as a unit. The sleeves $N^{47}$ and $N^{31}$ may be connected together by means of a locking pawl $N^{48}$ which is mounted on sleeve $N^{31}$ upon a pivot $N^{49}$ and provided at its upper end with a hook adapted to engage a projection $N^{50}$ on sleeve $N^{47}$. This sleeve $N^{47}$ is provided with an outwardly projecting arm carrying a detent $N^{52}$ mounted on pivot screw $N^{51}$ and adapted to maintain the locking pawl $N^{48}$ in the position shown in Figure 28, in which sleeve $N^{47}$ (and thereby also pawl 27) is compelled to follow the vertical motions of sleeve $N^{31}$. The detent $N^{52}$ is by means of a link $N^{56}$ and pivots $N^{60}$ and $N^{59}$ connected to a lever $N^{57}$ swinging on a pivot $N^{58}$ which is secured on the side plate $P^2$. The lever $N^{57}$ is by means of a rod $N^{62}$ and pivots $N^{61}$ and $N^{63}$ connected to the above mentioned carriage $N^{64}$ which is provided with a spring pressed push projection $N^{67}$. When the cam sector $O^1$ and sleeve $N^{31}$ are moved downwardly, the pawl carrying arm $N^{35}$ and the carriage $N^{64}$ are also moved downwardly, and as soon as projection $N^{67}$ on carriage $N^{64}$ reaches a projection on the depressed key of the keyboard the swinging motion of lever $N^{57}$ will cease, and since sleeve $N^{31}$ continues its downward stroke the detent $N^{52}$ will release locking pawl $N^{48}$, so that the movement of sleeve $N^{47}$ is stopped. Hereby pawl carrying arm $N^{35}$, Figure 19, is also stopped and is thus adjusted opposite to the numeral ring 23 corresponding to the depressed key $S^1$, and since sleeve $N^{31}$ is turned when it reaches the lowermost part of its path the shaft 34 will be turned, whereby pawl 27 turns the numeral ring 23 around tube 24. Simultaneously pawl $N^{22}$, Figure 22, will actuate the numeral ring (or numeral rings) $N^9$ so that the three numeral rings $N^9$ at any time indicate the total number of double-strokes of cam sector $O^1$ or in other words the sum of the numbers indicated by the various numeral rings 23 in slot 28, Figure 21. At the return stroke (upward stroke) of cam-sector $O^1$ the sleeve $N^{31}$, Figures 28 and 29, again engages sleeve $N^{47}$, and these sleeves are then locked together by means of locking pawl $N^{48}$ which engages projection $N^{50}$, while detent $N^{52}$ at the initial upward movement of sleeve $N^{47}$ is swung downwardly to lock locking pawl $N^{48}$. The sleeves $N^{31}$ and $N^{47}$ thereupon move jointly and carry pawl 27 and carriage $N^{64}$ up to their normal positions as shown in Figure 19. The swinging movements of detent $N^{52}$ is limited by means of inturned lips $N^{68}$ provided on the same and arranged to engage opposite sides of the arm projecting from sleeve $N^{47}$. In Figures 28 and 29 the reference character $N^{69}$ designates a spring pressed snap ball accommodated in a bore in said arm and adapted to engage one or other of two depressions produced in detent $N^{52}$ to thereby maintain the same in one or other of its extreme positions. The movement of locking pawl $N^{48}$ is limited by a pin $N^{70}$ secured in sleeve $N^{31}$ and engaging a slot in the locking pawl.

It may be remarked here that the counter shown in Figure 19 is a modification of that shown in the diagrammatical Figures 16 and 17 in so far as the shaft 34 is concerned, since in Figure 19 said shaft is not displaceable in axial direction, whereas on the other hand pawl 27 is slidable along the shaft.

When an order comprising clothes of different groups has been marked and counted the counter must be reset into the zero position before a fresh order can be dealt with. This is done by means of the handle $N^4$, Figure 19. The pawl $N^5$ is released, and then tube 24 carrying the numeral rings 23 and $N^9$ is turned by means of crank $N^3$ in a counter-clock-wise direction Figure 20, until crank $N^3$ is stopped by engaging stop plate $N^{73}$ secured upon the counter casing $Q^1$ by means of screws $N^{72}$. Hereby the projections 35 on rings 23 will successively engage the stopping edge $N^{74}$, Figure 21, of the stereotypic plate 29, and simultaneously the three pawls $N^{14}$, Figure 22, will engage those notches $N^{12}$ which appear in slot $N^{18}$ and which through the rotation of tube 24 successively are moved to engagement with the pawls, whereby further turning movement of the numeral rings $N^9$ is prevented. The crank $N^3$ is then turned in the oppposite direction to engage the opposite end of stop plate $N^{73}$. All of the rings 23 will then occupy the position shown in Figure 21, in which no figures 26 are visible through slot 28, and the numeral rings $N^9$ will indicate the figures 000 in slot 28. The counter is thus adjusted in the zero position, and a fresh counting operation may begin.

It will be understood from the foregoing that the crank $N^3$ must not be turned in a clock-wise direction before it has engaged stop plate $N^{73}$ at the end of the counter-clockwise turning movement. To prevent incidental turning of tube 24 the same is provided with a collar $N^{76}$, Figures 19 and 23, having teeth $N^{75}$ and two curved notches $N^{77}$. This collar is adapted to coact with a pawl $N^{78}$ pivotally mounted on stud $N^{79}$ secured on the counter casing $Q^1$ in the opening $Q^4$. This pawl is normally held in the position shown in full lines in Figure 23 by a spring $N^{80}$, one end of which engages the pawl while the other end is connected to a fixed hook $N^{82}$. The notches $N^{77}$ are so positioned that when crank $N^3$, Figure 20, engages one or the other side of stop plate $N^{73}$ one or the other of said notches will oppose the pawl $N^{78}$. When tube 24 is turned pawl $N^{78}$ will slip over the teeth $N^{75}$ and prevent incidental rotation of the tube in the opposite direction until a notch 77 opposes the pawl.

The locking mechanism for the tube carrying the numeral rings.

When the machine performs marking and accounting operations the tube 24 is not only locked by the pawl $N^5$, Figure 19, but also by an L-shaped locking bar $N^{83}$, Figure 23, influenced by a compressed spring $N^{84}$ mounted between pin $N^{86}$ on bar $N^{83}$ and a shoulder formed on the inner side of the counter casing $Q^1$. One end of locking bar $N^{83}$ is adapted to engage an aperture $N^{85}$ formed in tube 24 to thereby lock this tube during the counting operation. When the machine has counted the units of an order it is desired to produce a printed order sheet specifying the numbers of the various groups of articles as above mentioned, and to this end a strip of paper is pressed against the stereotypic plate 29 by means of a plate VI, Figure 19, which thereby engages the end $N^{87}$ of locking bar $N^{83}$, Figure 23, so that the locking bar is moved towards the right, and hereby the tube 24 is released. The locking bar is retained in the position shown in Figures 23 and 24 by a detent plate $N^{88}$ which is suspended by a riveted stud $N^{89}$ loosely engaging a wide bore in the wall of the counter casing $Q^1$, and provided outside this wall with a split $N^{90}$. To the detent plate $N^{88}$ is riveted a U-shaped member $N^{91}$ which passes through the aperture $Q^4$ in the counter casing and is connected by means of a spring $N^{92}$ and a hooked pin $N^{93}$ to the fixed plate $S^2$ forming part of the keyboard. The spring $N^{92}$ tends to draw the member $N^{91}$ outwardly, and therefore as soon as the locking bar $N^{83}$ is moved towards the right as explained above the member $N^{91}$ snaps behind the end of the locking bar as shown in Figure 23 and thereby maintains the same in the retracted position. When the tube 24 is afterwards turned to reset the numeral rings in the zero position the projection $N^{94}$ on tube 24 will slip over the projection $N^{95}$ on member $N^{91}$ owing to the inclined engaging surfaces of these two projections. Hereby the locking bar $N^{83}$ is only pressed a little more towards the right but is not yet released from the detent plate $N^{88}$. However, when the tube 24 is turned back again, the projection $N^{94}$ will strike the projection $N^{95}$ so that the detent plate $N^{88}$ is pushed away from the end of the locking bar $N^{83}$, which therefore under the influence of spring $N^{84}$ immediately engages the aperture $N^{85}$, thereby locking the tube 24 against rotation. The tube 24 is provided with spare openings $N^{96}$, Figures 19 and 23.

The key-board, Figures 19, 20, 23 and 29.

In order to make it possible to adjust the pawl 27, Figure 19, opposite to any desired numeral ring 23 there is arranged by side of the counter a key-board provided with as many keys $S^1$ as there are rings 23 in the counter. This key-board comprises a plate $S^2$ the lowermost end of which is secured by means of screws $S^5$ to the frame $R^3$, while the top end of the plate is secured by means of screws $S^4$ to the counter casing $Q^1$. To the rear side of this plate $S^2$ is secured a rail $S^3$, along which the carriage $N^{64}$ mentioned above travels. As shown in Figure 23 this rail $S^3$ has a Z-shaped cross section. The carriage comprises a frame $N^{64}$, Figure 29, in which there are rotatably mounted four wheels $N^{66}$ upon shafts $N^{65}$. These wheels run on the rail $S^3$ as shown in Figure 23. The carriage frame is provided with the above mentioned spring pressed push projection $N^{67}$. To the front side of plate $S^2$ there is secured by means of screws $S^6$, Figure 19, a plate $S^7$ which is furnished in alignment with each key $S^1$ with an inscription indicating a certain group of articles and being identical with that inscription on the stereotypic plate 29 which belongs to the numeral ring 23 corresponding to the considered key $S^1$. The keys pass through slots $S^{10}$ in the plate $S^2$, Figure 23, and are rotatably mounted on a common shaft $S^8$, which is held in position upon the rear side of plate $S^2$ by means of a metal strip $S^9$, Figure 19, which is provided with a longitudinal recess receiving the shaft $S^8$, while the longitudinal edges of the strip are secured upon the rear side of plate $S^2$. At each key $S^1$ the metal strip $S^9$ is provided with a slot so that the key may be mounted on the shaft and swing through said slot. The edge of rail $S^3$ which is turned upwardly in Figure 23 presents a series of notches in alignment with the keys, so that when a key is depressed from the position shown in full lines to that shown in dotted lines the end of the key lying behind plate $S^2$ enters a notch and is maintained and supported therein, whereby it is obtained that the end of the key is not bent by the impact of projection $N^{67}$ on the carriage against the key.

To the rear side of plate $S^2$ there are secured four angle plates $S^{11}$, Figure 19, in which a bar $S^{12}$ and a shaft $S^{13}$ are secured. Each key $S^1$ is provided with a spring (not shown) which keeps the inner end of the key pressed against the rod $S^{12}$ as shown in Figure 23. The shaft $S^{13}$ carries a swing plate $S^{14}$ influenced by a spring $S^{15}$, which tends to move the swing plate to the position shown in dotted lines, in which the plate bears against lugs $S^{16}$ on the angle plates $S^{11}$ and locks any depressed key $S^1$ by means of the edge $S^{18}$ of the swing plate. The key is retained in this locked position until another key is depressed. The inner end of this second key will namely engage a projecting edge $S^{17}$ on swing plate $S^{14}$ and thereby push the edge $S^{18}$ of the swing plate away from the key previously depressed, which, therefore, due to the action of its spring immediately swings towards its initial position adjacent the stop bar $S^{12}$, whereupon the key last depressed is locked by the swing plate. Thus it will be understood that in any moment only one key $S^1$ is retained in depressed position.

If during the operation of the machine the cam-sector $O^1$ is swung downwardly and no key $S^1$ has been depressed, none of the numeral rings 23 of the counter will be turned, since the pawl 27 will be carried to a position below the lowermost ring 23, and simultaneously the pawl $N^{22}$ by a simple mechanism (not shown) is prevented from turning the numeral rings $N^9$. Thus the counter is put completely out of operation in the case of no key $S^1$ being depressed.

To the swing plate $S^{14}$, Figures 19 and 23, is secured an eye $S^{19}$ which embraces a stud $S^{20}$ on the lower end of a lever $S^{21}$ which is mounted on a pivot $S^{22}$ journalled in a lug $Q^5$ cast integrally with the counter casing $Q^1$. The uppermost bifurcated end of lever $S^{21}$ engages the locking bar $N^{83}$, so that when the latter is disengaged from tube 24 and moved to the position shown in Figure 23, the lever $S^{21}$ will retract the swing plate $S^{14}$ from the key depressed as the last one during the marking and counting operation, whereby this key is released. When on the other hand the tube 24 is locked by the end of locking bar $N^{83}$ engaging the aperture $N^{85}$, the stud $S^{20}$, Figure 19, on lever $S^{21}$ will be so positioned that the swing plate $S^{14}$ can move freely between the extreme positions shown in Figure 23, thereby locking and unlocking the depressed keys $S^1$. Thus the swing plate is only put out of operation, when the locking bar $N^{83}$ releases the tube 24.

*The cam-sector, Figure 18.*

All of the heretofore explained motions of the operating elements of the marking machine are effected by means of the cam-sector $O^1$, which swings downwardly from the position shown in full lines in Figure 18 to the position shown in dotted lines and back again. The downward swing of the cam sector is effected by operating a foot-pedal $O^{12}$ which is pivoted on shaft $O^{11}$ and connected by means of a rod $O^{14}$ and pivots $O^{13}$ and $O^{15}$ to the cam-sector $O^1$. Shaft $O^{11}$ is secured in the base frame $R^1$. The cam-sector is moved back again to the initial position by means of a spring $O^{16}$ connected by a pin $O^{17}$ to the cam-sector and by a pin $O^{18}$ to the side plate $P^2$. The upward stroke of the cam-sector is limited by a stop bar $O^{19}$ rigidly mounted in the side plates $P^2$ and $P^3$. In a similar manner the downward stroke of the cam sector is limited by a stop bar $O^{20}$ which is also rigidly secured in the side plates $P^2$ and $P^3$.

*The frame of the machine.*

The perforator frame $P^1$, Figures 18 and 20, comprises a box-like frame which is secured upon the upper end of the side plates $P^2$ and $P^3$ of the knotter casing by means of screws $P^7$ and guiding pins $P^8$. The top wall of the perforator frame is provided with two large openings normally covered by removable covers $P^9$ and $P^{10}$, which are fitted in suitable notches as shown in Figure 18.

The knotter casing comprises the side plates $P^2$ and $P^3$ above mentioned, which at their upper ends are connected to each other by means of the perforator frame $P^1$, while the lowermost ends of the side plates are rigidly interconnected by means of cross-beams $P^5$ and $P^{11}$ and screw-bolts $P^{12}$. At the left hand side of the plates $P^2$ and $P^3$, Figure 18, the space between these plates is covered by a screen $P^{13}$, and at the right hand side the space between the plates is covered by a screen $P^{14}$ which has a vertical depression receiving the needle bar 12 and the outer end of the knotter frame $M^1$ and is prolongated downwardly beyond the cross-beam $P^5$, thereby protecting the lowermost end of the needle bar. The noose $P^4$ is secured to the side plates $P^2$ and $P^3$ by means of screws $P^{15}$. These side plates are provided at their inner surface with reinforcing webs $P^{16}$ in which the bearings for several of the above mentioned shafts of the machine are placed. A horizontal frame $R^3$ is bolted to side plate $P^2$ by means of screw bolts $P^{12}$ and a screw $P^{17}$, Figure 19. The above mentioned frame members $P^2$, $P^3$, $P^5$, $P^{11}$ and $R^3$ bear by means of a horizontal web $P^{18}$, Figure 18, upon the casing $R^2$ and are secured to the same by screws $R^4$, and this casing $R^2$ is by screws $R^5$ secured to the base frame $R^1$, which may be clamped upon any suitable foundation by anchoring bolts $R^6$, Figure 20. The foot pedal $O^{12}$, Figure 18, works in slots $R^7$ in base frame $R^1$ and casing $R^2$.

The frame for the counting apparatus comprises the above mentioned counter casing $Q^1$, Figures 18–24, which at the side facing the frame for the knotting apparatus is provided with four lugs $Q^6$ secured to the side plate $P^2$ by means of screws $Q^7$, Figure 18, which are inserted through holes in this plate and screwed into threaded bores $Q^8$ (Figure 22) in said lugs $Q^6$. The stereotypic plate 29 having the slot 28 is secured to the counter casing $Q^1$, the lower part of which at the side facing the key board, Figure 19, is provided with an aperture in which pawl $N^{22}$ swings. In a similar way the upper part of the counter casing $Q^1$ is provided with the aperture $Q^4$, Figure 23, previously referred to, in which pawl $N^{78}$ and the U-shaped member $N^{91}$ are positioned. At top the casing $Q^1$ is provided with an opening $Q^{12}$, Figure 19, through which a crank $U^2$ to be described in the following operates. The bottom opening of casing $Q^1$ is covered by the top wall of the above-mentioned frame member $Q^2$. This frame member is U-shaped in cross-section and carries at bottom the bearing $Q^3$ for the shaft 34. The casing $Q^1$ at top is provided with a wide slot $Q^{10}$, Figure 20, through which the carriage $N^{64}$ may be mounted on its travelling rail or removed, and which is normally covered by a plate $Q^{11}$, Figure 19.

*The shifting mechanism for the perforator discs.*

All of the articles of one order are provided with marks showing identical perforated numbers for instance the number 1200, Figure 3, and it is desirable that this number, which may conveniently be called the number of the order, should also appear on the printed record sheet which specifies the number of articles in each group of the order. To obtain this result a counting and printing device (an order counter) must be provided which is shifted in harmony with the shifting of the perforator discs. This device is shown partially diagrammatical in Figure 19 and comprises four numeral discs $T^1$ arranged side by side immediately below the top wall of the frame member $Q^2$. Each disc $T^1$ is provided at its periphery with ten figures from 0 to 9 and mounted to rotate upon a common shaft $T^3$. Each disc $T^1$ is also provided on one side thereof with a ratchet wheel (not shown), and these four ratchet wheels may be advanced by a common pawl $T^2$ in the usual way and in a manner similar to the shifting of the perforator disc by pawl 9, Figure 2, so that these discs $T^1$ will at any time present in alignment with slot 28 of tube 24 a number corresponding to the number formed by the active pins of the perforator discs. Pawl $T^2$, Figure 19, is mounted by pivot $T^5$ on a pawl carrying arm $T^4$ which is secured on shaft $T^3$. This shaft is journalled at both ends in bearings formed on a frame $T^6$, to which counter springs $T^7$ are secured by screws $T^8$. These counter springs are flat springs engaging the teeth of the above mentioned ratchet wheels to prevent incidental turning of the same.

The pawl 9 of the perforator and the pawl $T^2$ of the numeral discs $T^1$ are actuated simultaneously by means which will now be described.

The lugs $Q^6$, Figures 18, 20 and 21, of the counter casing $Q^1$ are provided with bearing bosses $U^5$ in which there is journalled a vertical crank shaft $U^1$ provided with three cranks $U^2$, $U^3$ and $U^4$, Figures 44-46, one of which $U^2$ as mentioned above passes through an aperture $Q^{12}$, Figure 19, in the casing $Q^1$ and engages by means of its crank pin $U^7$ a cam groove $U^8$ formed in the top wall of tube 24. The crank shaft $U^1$ is suspended by means of this crank pin $U^7$. The cam groove $U^8$, Figure 20, is so formed that when tube 24 is turned in one direction and thereafter in the opposite direction to adjust the numeral rings 23 in the zero positions as above explained, whereby the counter is adjusted to begin a new counting operation the shaft $U^1$ with the cranks $U^2$, $U^3$ and $U^4$ will be swung to the positions shown in dotted lines in Figure 46 and back again to the positions shown in full lines. Through this movement of shaft $U^1$ the perforator discs and the discs $T^1$ of the order counter are shifted.

In Figures 44 and 46 the finger 4 actuating the perforating punches is shown in dotted lines. Before the perforator discs can be turned by pawl 9 this finger 4 must be raised to such a degree that its lowermost end is carried above the level of the uppermost perforator disc. This is done by means of a sliding plate $U^{12}$, Figures 44-46, which is provided with three slots $U^9$, $U^{10}$ and $U^{11}$ and arranged adjacent the finger 4. On the perforator frame (not shown in these figures) two pins $U^{13}$ and $U^{14}$ are secured which engage the slots $U^9$ and $U^{10}$ respectively, so that a plate $U^{12}$ is suspended upon and may slide horizontally on these pins. The finger 4 is provided with a pin $U^{15}$ which engages slot $U^{11}$ of plate $U^{12}$. This plate is connected by means of a connecting rod $U^{16}$ to the crank $U^3$, which is provided with a boss $U^{17}$ engaged by rod $U^{16}$ the opposite end of which is provided with a pin $U^{19}$ engaging a horizontal lip $U^{18}$ formed on plate $U^{12}$. Upon the fixed shaft 2 of the perforator discs 1 there is rotatably mounted below said discs an arm $U^{19}$, Figure 46, which slides on the upper surface of plate $K^{20}$, Figure 18, and carries pawl 9 on pivot $U^{20}$, Figure 46. Pawl 9 shifts the perforator discs in the well known manner. Arm $U^{19}$ is engaged by a pin $U^{21}$ on a rod $U^{22}$ having in its opposite end another pin $U^{22'}$ which engages a slot $U^{23}$ in a horizontal lip $U^{24}$ formed on plate $U^{12}$, so that this plate may be displaced a limited distance horizontally without moving rod $U^{22}$. The lowermost crank $U^4$ of shaft $U^1$ is by crank pin $U^6$ connected to a rod $U^{25}$ engaging a pin $U^{26}$ on a crank $U^{27}$ formed on one end of the shaft $T^3$ of the numeral discs of the order counter. The crank $U^3$ may swing in a hole $U^{28}$ formed in the frame member $P^1$ and the side plate $P^2$, Figures 18 and 20. The crank $U^4$ moves in a hole $U^{29}$ produced in side plate $P^2$, Figure 19.

When the tube 24 of the counter is turned crank $U^2$ Figure 46, is swung from the position shown in full lines to that shown in dotted lines, whereby crank $U^3$ will push plate $U^{12}$ towards the right. During the first part of this movement finger 4 will be raised since pin $U^{15}$ slides upwardly through the inclined part of the slot $U^{11}$ into the left hand horizontal part of the same. When this position has been reached finger 4 has been raised so that the lowermost end of the same is carried above the level of the uppermost perforator disc, and then the left hand end of slot $U^{23}$ in lip $U^{24}$ by the continued movement of plate $U^{12}$ engages pin $U^{22'}$, whereby pawl arm $U^{19}$ in last part of the swing of crank $U^3$ is swung from the position shown in full lines to that shown in dotted lines. Hereby the pawl 9 shifts the number of the perforator discs. Furthermore crank $U^4$ actuates shaft $T^3$ whereby pawl $T^2$, Figure 19, will shift the number presented by the numeral discs $T^1$.

When the tube 24 is thereafter turned in the opposite direction to adjust the numeral discs 23 in the zero positions, the crank shaft $U^1$ with associated parts including pawls 9 and $T^2$ is moved back to the normal position.

The thread guiding means, Figures 18, 19, 47 and 48.

The threads used for tying the marks on to the clothes are supplied from two bobbins $Y^2$, Figure 19, positioned on pins $Y^3$ projecting from the frame $P^1$. The threads $Y^1$ are led from these bobbins downwards along the outside of the knotting apparatus casing and through a hole $Y^4$ formed in the side plate $P^2$, whereupon the threads pass through eyes $Y^8$, Figures 47 and 48, in a guiding plate $Y^6$, then around a pin $Y^9$ and upwards through eyes $Y^7$ in the said guiding plate $Y^6$ and finally through the eyes of the needles 13. The guiding plate $Y^6$ is secured upon the sleeve $M^{12}$ carried by the needle bar 12 by means of a screw $Y^5$. The pin $Y^9$ is screwed into the sleeve $M^{12}$ and carries two two-part clamping discs $Y^{10}$ which are mounted loosely on the pin. A lever $Y^{13}$ is by means of a pivot $Y^{14}$ mounted on a bifurcated lug $Y^{15}$ cast integrally with sleeve $M^{12}$, and the upper bifurcated end of this lever embraces pin $Y^9$ and engages the rear side of the innermost clamping disc. A compressed spring $Y^{11}$ is placed on pin $Y^9$ and bears against sleeve $M^{12}$ and the upper end of lever $Y^{13}$, so that each thread $Y^1$ during the knotting and thread cutting operations is held firmly between the two spring pressed parts of the associated clamping disc. When a mark has been tied on to the article and a new knotting operation is to begin, the threads $Y^1$ must be released in order to supply thread to the next knotting operation. This is done by means of lever $Y^{13}$ which is provided with a cam end $Y^{12}$ adapted to co-act with a bent releasing bar $Y^{16}$ secured in frame member $P^5$. When the needle bar 12 performs its motions the clamping discs $Y^{10}$ and thereby the threads $Y^1$ are released by the cam end $Y^{12}$ of lever $Y^{13}$ sliding on the edge $Y^{17}$ of the releasing bar $Y^{16}$. As long as the cam end $Y^{12}$ bears against this edge $Y^{17}$, the upper end of lever $Y^{13}$ is held in a position to the left of the position shown in Figure 48, whereby the spring $Y^{11}$ is still more compressed and the threads $Y^1$ are released, so that they may slide freely around the pin $Y^9$.

The printing device, Figures 18-20.

When a number of articles has been provided with marks and counted, one or more printed records of the counted specification is produced by means of a printing device arranged on the front side of the counting apparatus. This printing device comprises a pressing plate $V^1$, Figures 19 and 20, to which side plates $V^2$ are secured by means of screws $V^3$. The pressing plate $V^1$ is mounted to swing towards and away from the stereotypic plate 29 on a horizontal shaft $V^5$ which is secured in the side plates $P^2$ and $P^3$ and engages notches $V^4$ formed in the lower edges of the side plates $V^2$ secured on the pressing plate. The pressing plate $V^1$ is actuated by means of a crank $V^6$, Figures 18-20, provided with a handle V and secured on a shaft $V^7$ journalled in bearings $V^8$, Figures 18 and 20, which are carried by side plates $V^9$. These side plates $V^9$ are clamped by means of screws $V^{10}$ to the counter casing $Q^1$. The said shaft $V^7$ carries between the side plates $V^9$ two eccentrics $V^{11}$ which are connected to the pressing plate $V^1$ by means of plate links $V^{12}$, Figures 19 and 20, one end of which is provided with a boss $V^{13}$ encircling the eccentric, while the inner ends of the plate links are rigidly interconnected by a bar $V^{14}$ engaging notches $V^{15}$ formed in lugs $V^{16}$ on the pressing plate $V^1$. Thus it will be understood that the pressing plate is swung on pivot $V^5$ when the shaft $V^7$ is turned by actuating the handle V. The bar $V^{14}$ is maintained in the notches $V^{15}$ by means of locking pawls $V^{17}$ pivoted on screws $V^{18}$ which are secured in the pressing plate $V^1$.

When the machine performs its marking and counting operations the crank $V^6$ occupies the position diagrammatically opposite to that shown in Figure 18, and then the pressing plate $V^1$ is retracted from the stereotypic plate, so that the numeral rings of the counter may be shifted freely.

Between the side plates $V^2$, Figures 18-20, a paper feed roll $V^{19}$ is mounted on a shaft $V^{21}$ which fits loosely in holes in said plates and may be removed lengthwise by means of a handle $V^{20}$, Figure 20. The paper strip $V^{26}$, Figure 19, passes from the feed roll $V^{19}$ downward between two guiding rollers $V^{24}$ and $V^{27}$, half round the circumference of the last named roller and then upwards between the stereotypic plate 29 and the pressing plate $V^1$, the upper end of which is provided with a spring member $V^{31}$, Figures 18 and 19, adapted to hold the upper end of the paper strip, and further provided with a toothed plate $V^{32}$, against which the end of the paper strip when provided with a printed record may be torn off.

The above mentioned roller $V^{24}$ has a rubber-coated cylindrical surface and is provided with two rigidly secured bearing pins, by means of which the roller is journalled in a bow $V^{23}$ swinging on pivots $V^{22}$ secured to the inner side of the plates $V^2$. The roller $V^{24}$ is pressed yieldingly against the roller $V^{27}$ by means of a spring $V^{28}$ connected at one end to a pin $V^{29}$ on bow $V^{23}$ and at the other end to a pin $V^{30}$ secured on side plate $V^2$. The roller 27 is also provided with a rubber-coated cylindrical surface and is mounted on the side plates $V^2$ by two bearing studs. That bearing pin of the roller $V^{24}$ which is nearest to the crank $V^6$ passes freely through a curved slot in the adjacent side plate $V^2$ and is provided outside the same with a head $V^{25}$, Figure 20, by means of which the feed roller $V^{24}$ may be turned by hand to advance the paper strip.

As above mentioned the pressing plate $V^1$ is normally retracted from the stereotypic plate 29. When it is desired to produce a printed record the crank $V^6$ is rotated one complete revolution, whereby the pressing plate $V^1$ will press the paper strip $V^{26}$ against the stereotypic plate 29 and also against the figures on the numeral rings 23 and $N^9$ appearing in slot 28 and those figures on the numeral discs $T^1$ of the order counter, which face towards the pressing plate, and then the pressing plate is moved back again. The desired record thus is printed on the paper strip by means of an ink ribbon $X^1$ which lies between the stereotypic plate and the paper strip. When the printed record has been made, the paper strip is drawn upwards, and the printed order sheet is torn off against the toothed plate $V^{32}$.

When the types of the printing device are to be cleansed the pressing plate $V^1$ is removed by swinging the locking pawls $V^{17}$ upwards, whereby the bar $V^{14}$ is released and may be swung upwards around shaft $V^5$ as pivot. The pressing plate $V^1$ with paper feed roll $V^{19}$ and guiding rollers $V^{24}$ and $V^{27}$ then is lifted out of engagement with shaft $V^5$, drawn somewhat to the right and then removed by being drawn downwards in the space between the counter and the shaft $V^7$.

*The feeding device for the ink ribbon.*

The ink ribbon $X^1$ lying between the stereotypic plate 29 and the paper strip $V^{26}$, Figure 19, has its ends wound on two bobbins $X^2$ and $X^3$ respectively, the lowermost of which $X^2$ is mounted to rotate on shaft $V^5$, while the uppermost bobbin $X^3$ is rotatably mounted on a branch $X^4$ projecting from the stereotypic plate 29. This branch $X^4$ is provided with a horizontal guiding bar $X^5$ over which the ink ribbon $X^1$ is guided to the bobbin $X^3$. The bobbins $X^2$ and $X^3$ are provided each with a ratchet wheel (not shown) which meshes with spring actuated pawls $X^7$ and $X^6$ respectively. These pawls are pivoted to horizontal arms on opposite ends of a vertical shaft $X^8$ which is mounted to turn and slide vertically in two bearings $X^9$ secured to the counter casing $Q^1$. At any time only one of these pawls engages the corresponding ratchet wheel, and such engagement is maintained until the ink ribbon has been completely unwound from the other bobbin, whereafter shaft $X^6$ is displaced vertically to remove the pawl from the ratchet wheel and bring the pawl at the opposite end of the shaft in engagement with the other ratchet wheel. Thus it will be understood that the ink ribbon travels stepwise upwards between the stereotypic plate and then stepwise downwards and so on. The shaft $X^6$ is maintained in the uppermost and lowermost positions by means of a spring (not shown) which is placed in the uppermost bearing $X^9$ and adapted to engage one or the other of two spaced circumferential grooves on shaft $X^8$. In Figure 19 the shaft $X^8$ is shown in its top position, in which pawl $X^6$ engages the ratchet wheel on bobbin $X^3$. When a printed record is taken and the pressing plate $V^1$ is thereafter moved to the right of the position shown in Figure 19, the pressing plate $V^1$ engages an arm (not shown) on shaft $X^8$, whereby a small turning movement is imparted to this shaft, so that pawl $X^6$ will turn bobbin $X^3$ whereby the ink ribbon is drawn a short step upwards. This operation is repeated until the ink ribbon has been completely unwound from bobbin $X^2$. When shaft $X^8$ is then turned again, the bobbin $X^3$ can not turn, and thereafter, pawl $X^6$ will swing to a vertical position around that end of the pawl which engages the ratchet wheel. Hereby shaft $X^8$ is displaced downwards to bring the other pawl $X^7$ in engagement with the ratchet wheel of bobbin $X^2$. The pawl $X^7$ thereafter remains active, until the ink ribbon has been completely unwound from bobbin $X^3$, whereupon the direction of travelling of the ink ribbon is again reversed. When shaft $X^8$ is displaced downwards from the position shown in Figure 19 the pawl $X^6$ as indicated above will occupy a position in prolongation of the shaft. When the latter is turned next time a spring $X^{10}$ will retract the pawl $X^6$ to its normal position relative to shaft $X^6$. Pawl $X^7$ is provided with a similar spring.

Having thus fully described my invention I claim as new and desire to secure by Letters Patent:

1. A machine of the type described, in which a mark is adapted to be placed upon an article, the needle 13 carrying a thread adapted to pass through the article and mark thus forming a loop, the catch 16 adapted to carry the loop around the edge of the article and the mark, the reciprocating and turnable knotter hook 17 adapted to form a knot on the thread around the movable knotter finger 18, which is afterward withdrawn from the knot thus formed, the catch 16, the knotter hook 17, the knotter finger 18, being carried by the knotter frame $M^1$ which is allowed to swing around an axis at the end of the frame lying farthest away from the path of the needle 13, the said frame carrying at its opposite end the plate 11 for supporting the article to be marked, and pressing the same against the fixed support $P^4$ during the knotting operation.

2. The device of claim 1, the knotter frame $M^1$ being connected to and actuated from the cam sector $O^1$ by means of two telescopic spring pressed members $M^4$ and $M^5$.

3. The device of claim 1, said knotter hook 17 being mounted to slide in the frame $M^1$ toward and away from the plate 11 and connected to the cam sector $O^1$ by a lever mechanism $M^{14}$ for effecting such movement, the knotter hook having a screw threaded portion $M^{35}$ coacting with a non-rotatable displaceable nut member $M^{32}$, and a lever mechanism $M^{15}$ and $M^{31}$ connected to the cam sector $O^1$ for effecting the turning movement of the knotter hook.

4. The device of claim 1, said knotter hook 17 being mounted to slide in the frame $M^1$ toward and away from the plate 11 and connected to the cam sector $O^1$ by a lever mechanism $M^{14}$ for effecting such movement, the knotter hook having a screw threaded portion $M^{35}$ coacting with a non-rotatable displaceable nut member $M^{32}$, and a lever mechanism $M^{15}$ and $M^{31}$ connected to the cam sector $O^1$ for effecting the turning movement of the knotter hook, the nut member $M^{32}$ having a roller $M^{34}$ running on the threads of the portion $M^{35}$.

5. The device of claim 1, said knotter hook 17 being mounted to slide in the frame $M^1$ toward and away from the plate 11 and connected to the cam sector $O^1$ by a lever mechanism $M^{14}$ for effecting such movement, the knotter hook having a screw threaded portion $M^{35}$ coacting with a non-rotatable displaceable nut member $M^{32}$, and a lever mechanism $M^{15}$ and $M^{31}$ connected to the cam sector $O^1$ for effecting the turning movement of the knotter hook, said catch 16 having a hook 15 for catching the loop formed on the thread mounted on the frame $M^1$ and operated by the cam sector $O^1$ so that the hook 15 will move through a substantially semicircular path around the inner end of the supporting plate 11 for carrying the loop to a position below said plate, and returning to a position above said plate to catch the next loop.

6. The device of claim 1, said knotter finger 18 being yieldable and secured at one end to the catch 16, and being retracted from the knot by which the mark is secured to the article by impinging against the plate 11 at the upward stroke of the catch 16.

7. The device of claim 1, said knotter finger 18 being yieldable and secured at one end to the catch 16, and being retracted from the knot by which the mark is secured to the article by impinging against the plate 11 at the upward stroke of the catch 16, said knotter hook being provided with a slidable knife 19 for cutting the thread after the knot has been formed, said knife being displaced relative to the knotter hook to cut the thread by the members $M^{32}$ and $M^{34}$ engaging the member $M^{36}$, which is secured to the knife 19, the knife 19 being retracted by the member $M^{36}$ which impinges against a fixed part of the knotter frame $M^1$ while the knotter hook continues its stroke.

8. The device of claim 1, said knotter finger being yieldable and secured at one end to the catch 16, and being retracted from the knot by which the mark is secured to the article by impinging against the plate 11 at the upward stroke of the catch 16, and an additional knotter hook 17, and an additional catching hook 15 symmetrically arranged on the frame $M^1$, said knotter hooks being connected so as to move lengthwise as a unit, and turned commonly by the nut member $M^{32}$.

In testimony whereof I have affixed my signature in presence of two witnesses.

JENS HÖLTERMAND.

Witnesses:
C. V. HÖGSTED,
J. O. SELSING.